United States Patent
Takase et al.

(10) Patent No.: US 11,552,875 B2
(45) Date of Patent: Jan. 10, 2023

(54) COMMUNICATION SUPPORT SYSTEM AND METHOD

(71) Applicant: Hitachi, Ltd., Tokyo (JP)

(72) Inventors: Masayuki Takase, Tokyo (JP); Tomoyuki Iijima, Tokyo (JP); Junnosuke Wakai, Tokyo (JP); Satoru Ishikawa, Tokyo (JP); Takaaki Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/456,788

(22) Filed: Nov. 29, 2021

(65) Prior Publication Data
US 2022/0173995 A1 Jun. 2, 2022

(30) Foreign Application Priority Data
Nov. 30, 2020 (JP) .............................. JP2020-197762

(51) Int. Cl.
*G06F 15/173* (2006.01)
*H04L 45/02* (2022.01)
*H04L 45/302* (2022.01)
*H04L 12/46* (2006.01)

(52) U.S. Cl.
CPC .......... *H04L 45/02* (2013.01); *H04L 12/4641* (2013.01); *H04L 45/3065* (2013.01)

(58) Field of Classification Search
CPC .. H04L 45/02; H04L 12/4641; H04L 45/3065
USPC ....................................................... 709/223
See application file for complete search history.

(56) References Cited

U.S. PATENT DOCUMENTS

| | | | | |
|---|---|---|---|---|
| 7,778,236 B2* | 8/2010 | Yu | .......................... | H04L 47/748 370/386 |
| 8,050,219 B2* | 11/2011 | Thakare | ................ | H04W 80/02 370/328 |
| 9,866,499 B2* | 1/2018 | Lee | ...................... | H04L 12/2858 |
| 10,084,643 B2* | 9/2018 | Zhang | ..................... | H04L 41/12 |
| 10,374,947 B2* | 8/2019 | Callard | ................... | H04L 45/38 |
| 10,638,449 B2* | 4/2020 | Shan | ..................... | H04W 8/005 |

(Continued)

OTHER PUBLICATIONS

5G; System Architecture for the 5G System (5GS) (3GPP TS 23.501version 15.5.0 Release 15), ETSI TS 123 501 V15.5.0 (Apr. 2019), Technical Specification (242 pages) <https://www.etsi.org/deliver/etsi_ts/123500_123599/123501/15.05.00_60/ts_123501v150500p.pdf>.

*Primary Examiner* — Anthony Mejia
(74) *Attorney, Agent, or Firm* — Crowell & Moring LLP

(57) ABSTRACT

From among a U-plane and a C-plane, the U-plane is installed in a first user site which has a base station, and the C-plane is installed in a C-plane site (any site that is not a user site). A system sets a U-plane inter-site path which is an inter-site communication path that connects a first user site with a second user site via a wide area network, and a C-plane inter-site path which is an inter-site communication path that connects a C-plane site with the first user site via the wide area network. In addition, the system sets an in-site communication path which is a communication path within the first user site and which connects to an inter-site communication path. A U-plane inter-site path is an inter-site communication path via which data is transmitted or received by a U-plane. A C-plane inter-site path is an inter-site communication path via which a signal is transmitted or received by a C-plane.

9 Claims, 14 Drawing Sheets

(56) References Cited

U.S. PATENT DOCUMENTS

| | | | | |
|---|---|---|---|---|
| 10,798,592 B2 * | 10/2020 | Decuir | ............ | H04W 76/10 |
| 10,924,470 B2 * | 2/2021 | Metsala | ............ | H04L 9/3263 |
| 10,986,516 B2 * | 4/2021 | Dao | ............ | H04W 24/08 |
| 11,165,699 B2 * | 11/2021 | Filsfils | ............ | H04L 45/74 |
| 11,310,677 B2 * | 4/2022 | Lee | ............ | H04W 24/02 |

* cited by examiner

FIG.10  TRANSPORT PATH TABLE
51

| T-ID | IF-ID | IF-ID | QoS |
|---|---|---|---|
| 1 | 1 | 2 | 7 |
| 2 | 1 | 3 | 4 |
| ... | ... | ... | ... |

Columns: 1001, 1002, 1003, 1004

FIG.11  USER PATH TABLE
601

| V-ID | T-ID | QoS |
|---|---|---|
| 1 | 1 | 7 |
| 2 | 2 | 4 |
| ... | ... | ... |

Columns: 1101, 1102, 1103

FIG.12  CARRIER PATH TABLE
701

| U-ID | CARRIER V-ID | USER V-ID | T-ID | QoS |
|---|---|---|---|---|
| 1 | 1 | 300 | 30 | 8 |
| 1 | 2 | 400 | 40 | 4 |
| 1 | 3 | 500 | 50 | 4 |
| ... | ... | ... | ... | ... |

Columns: 1201, 1202, 1203, 1204, 1205

FIG.13

SETTING MANAGEMENT TABLE
1300

| U-ID<br>1301 | 5G FLAG<br>1302 | TYPE<br>1303 | V-ID<br>1304 | T-ID<br>1305 | S-ID<br>1306 | E-ID<br>1307 | R-ID LIST<br>1308 | QoS<br>1309 |
|---|---|---|---|---|---|---|---|---|
| 1 | YES | U-VLAN1 | 100 | 10 | 3 | 2 | 4, 5, 3 | 7 |
| 1 | YES | U-VLAN2 | 200 | 20 | 3 | 6 | 4, 5, 1 | 5 |
| 1 | YES | C-VLAN | 300 | 30 | 3 | 10 | 4, 5, 6 | 8 |
| 1 | YES | M-VLAN | 400 | 40 | 3 | 10 | 4, 5, 6 | 4 |
| 1 | YES | CARRIER_U-VLAN | 500 | 50 | 3 | 10 | 4, 5, 6 | 6 |
| 1 | YES | SENSOR_VLAN | 600 | 60 | 3 | 10 | 4, 5, 6 | 4 |
| 2 | YES | U-VLAN1 | 100 | 70 | 1 | 4 | 1, 5, 6 | 7 |
| 2 | YES | U-VLAN2 | 200 | 80 | 1 | 5 | 1, 5 | 4 |
| 2 | YES | C-VLAN | 300 | 90 | 1 | 10 | 1, 2, 6 | 8 |
| ⋮ | ⋮ | ⋮ | ⋮ | ⋮ | ⋮ | ⋮ | ⋮ | ⋮ |

1351, 1352

FIG.14
UPLINK MANAGEMENT TABLE
401U

| U-ID (1401) | SIM-ID (1402) | M-ID (1403) | LB (1404) | APN (1405) | V-ID (1406) | QCI (1407) | QoS (1408) |
|---|---|---|---|---|---|---|---|
| 1 | 1 |  | 1 | 1 | 100 | High | 7 |
| 1 | 2 |  | 1 | 1 | 100 | High | 7 |
| 1 | 3 |  | 1 | 2 | 200 | Middle | 4 |
| 1 | 4 |  | 0 | 100 | 500 | Middle | 4 |
| 1 | 5 |  | 1 | 2 | 200 | Middle | 4 |

FIG.15
DOWNLINK PROCESSING TABLE
401D

| U-ID (1501) | R_V-ID (1502) | SIM-ID (1503) | M-ID (1504) | LB (1505) | APN (1506) | T-ID (1507) | QCI (1508) | S_V-ID (1509) | QoS (1510) |
|---|---|---|---|---|---|---|---|---|---|
| 1 | 100 | 1 |  | 1 | 1 |  | High |  | 7 |
| 1 | 100 | 2 |  | 1 | 1 |  | High |  | 7 |
| 1 | 200 | 3 |  | 1 | 2 |  | Middle |  | 4 |
| 1 | 500 | 4 |  | 0 | 100 |  | Middle |  | 4 |
| 1 | 200 | 5 |  | 1 | 2 |  | Middle |  | 4 |

FIRST COMMUNICATION PATH TABLE
2000

| IF-ID | IF MODE | V-ID |
|---|---|---|
| 1 | TRUNK | 100, 200, 500 |
| 2 | TRUNK | 100, 200 |
| 3 | ACCESS | 100 |
| ... | ... | ... |

SECOND COMMUNICATION PATH TABLE
2100

| DESTINATION MAC | V-ID | IF-ID |
|---|---|---|
| 1 | 100 | 2 |
| 2 | 500 | 3 |
| 3 | 100 | 1 |
| ... | ... | ... |

COMMUNICATION SUPPORT SYSTEM AND METHOD

INCORPORATION BY REFERENCE

This application claims priority based on Japanese patent application, No. 2020-197762 filed on Nov. 30, 2020, the entire contents of which are incorporated herein by reference.

BACKGROUND

The present invention generally relates to supporting communication that is via a network.

Local 5G is known (5G is 5th Generation). Utilization of local 5G by companies, local government, and the like as stable wireless communication infrastructure in place of a wireless local area network (LAN) such as Wi-Fi (registered trademark) is expected. In Japan, a business operator (typically a mobile virtual network operator (MVNO)) differing from a business operator that has equipment for a wireless communication network (in other words, a mobile network operator (MNO)) can provide local 5G as a new communication service. Depending on the country, a business operator that has equipment for a wireless communication network can provide local 5G as a new communication service. Note that, as a disclosure relating to 5G, there is "5G; System architecture for the 5G System (5GS) (3GPP TS 23.501 version 15.5.0 Release 15)," ETSI TS 123 501 V15.5.0 (2019-04), TECHNICALSPECIFICATION <https://www.etsi.org/deliver/etsi_ts/123500_123599/123501/15. 05.00_60/ts_123501v150500p.pdf>, for example.

As equipment for local 5G, there is access equipment such as a base station and core network equipment (hereinafter, core equipment). The core equipment includes a control plane (C-plane) and a user plane (U-plane).

As exemplified in FIG. 1, it is assumed that local 5G is provided from an example of a communication carrier, which does not have wireless communication network equipment, to each of a user A and a user B who are customers of the communication carrier.

Core equipment is considered to be installed at a user site 1 (for example, a site where a base station or a user terminal is present) for each user. Via the core equipment installed at the user site 1, user data is transmitted and received between a user site 1 and a user site 2 (for example, a site where there is a server that communicates with a user terminal). "User data" is, for example, data transmitted and received between a user terminal in a user site 1 and a server in the user site 2.

Core equipment is typically expensive. Accordingly, when core equipment is needed for each user, it is difficult for the user to newly introduce local 5G, and as a result it is difficult to promote use of local 5G.

Such a problem is not limited to the provision of local 5G, and can be present for the overall provision of communication service (for example, private Long-Term Evolution (LTE)) that requires core equipment, including a C-plane and a U-plane.

SUMMARY

A communication support system has an inter-site setting unit and an in-site setting unit. An inter-site setting unit sets a U-plane inter-site path which is an inter-site communication path that connects a first user site with a second user site via a wide area network, and a C-plane inter-site path which is an inter-site communication path that connects a C-plane site with the first user site via the wide area network. An in-site setting unit sets an in-site communication path which is a communication path within the first user site and which connects to an inter-site communication path. The first user site is a site that has a base station and a user plane (U-plane) that processes user data. User data is data which is transmitted and received between a user terminal and a server, through a base station. A C-plane site is any site that is not a user site and has a control plane (C-plane) that performs at least one of authentication of user terminals and session management control. A U-plane inter-site path is an inter-site communication path via which data is transmitted or received by a U-plane. A C-plane inter-site path is an inter-site communication path via which a signal is transmitted or received by a C-plane.

By virtue of the present invention, it is possible to realize low-latency communication for which the cost of equipment installed at a user site is suppressed.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 10 illustrates an example of a configuration of a transport path table;
FIG. 11 illustrates an example of a configuration of a user path table;
FIG. 12 illustrates an example of a configuration of a carrier path table;
FIG. 13 illustrates an example of a configuration of a setting management table;
FIG. 14 illustrates an example of a configuration of an uplink processing table;
FIG. 15 illustrates an example of a configuration of a downlink processing table.

DESCRIPTION OF THE EMBODIMENT

Figure 1:
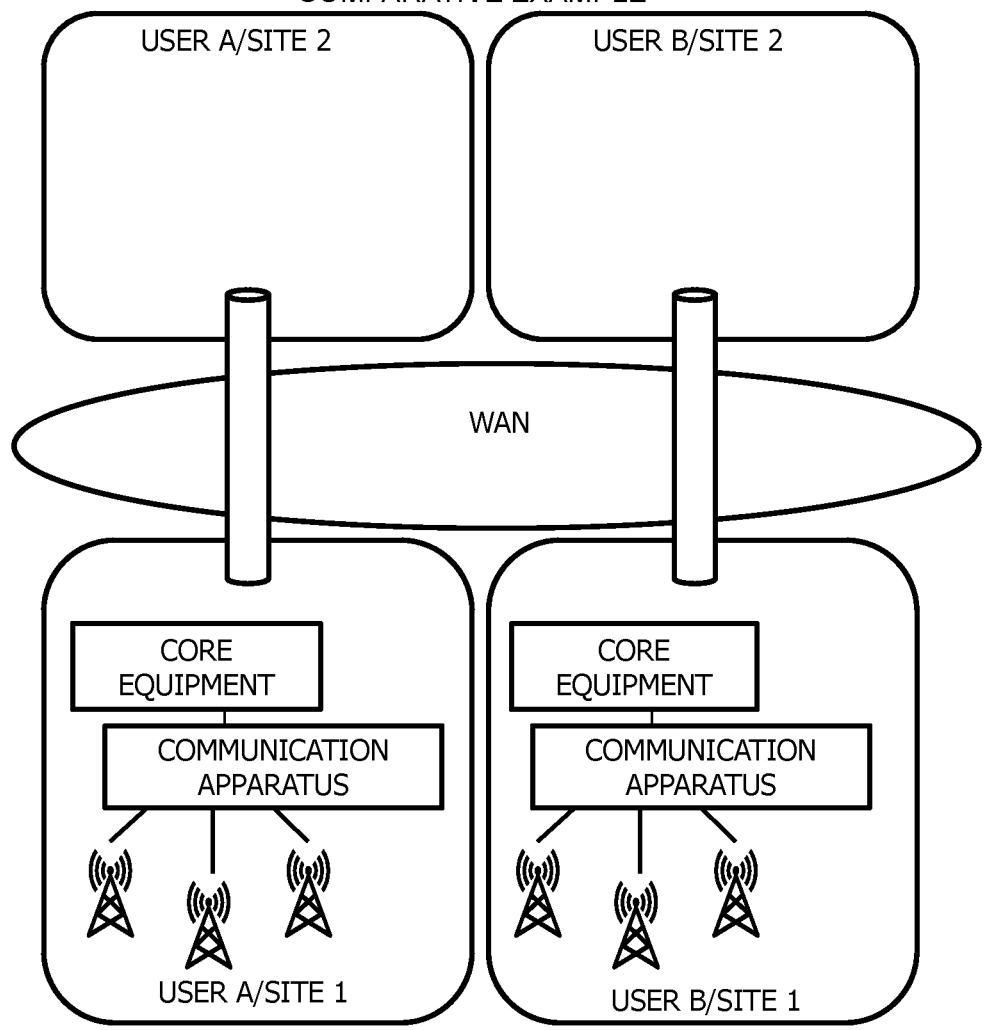
FIG. 1 illustrates a comparative example.

In the following description, an "interface apparatus" may be one or more interface devices. The one or more interface devices may be at least one of the following.

One or more input/output (I/O) interface devices. An input/output (I/O) interface device is an interface device with respect to at least one of an I/O device and a remote computer for display. An I/O interface device for a computer for display may be a communication interface device. At least one I/O device is a user interface device, and, for example, may be any of an input device such as a keyboard and a pointing device, or an output device such as a display device.

One or more communication interface devices. The one or more communication interface devices may be one or more of the same kind of communication interface device (for example, one or more network interface cards (NIC)), or may be two or more different kinds of communication interface devices (for example, a NIC and a host bus adapter (HBA)).

In addition, in the following description, "memory" is one or more memory devices which are an example of one or more storage devices, and typically may be a main storage device. At least one memory device in a memory may be a volatile memory device, or may be a non-volatile memory device.

In addition, in the following description, "persistent storage apparatus" may be one or more persistent storage devices which are an example of one or more storage devices. A persistent storage device typically may be a non-volatile storage device (for example, an auxiliary storage device), and specifically, for example, may be a hard disk drive (HDD), solid state drive (SSD), a non-volatile memory express (NVMe) drive, or a storage class memory (SCM).

In addition, in the following description, "storage apparatus" may be at least a memory from among a memory and a persistent storage apparatus.

In addition, in the following description, "processor" may be one or more processor devices. At least one processor device typically may be a microprocessor device such as a central processing unit (CPU), but may be another type of processor device such as a graphics processing unit (GPU). At least one processor device may have a single core or may have multiple cores. At least one processor device may be a processor core. At least one processor device may be a processor device in a broad sense, such as a circuit (for example, a field-programmable gate array (FPGA), a complex programmable logic device (CPLD), or an application-specific integrated circuit (ASIC)) which is an aggregate of gate arrays that performs some or all processing in accordance with a hardware description language.

In addition, in the following description, information for which output is obtained with respect to input is described with the expression "xxx table," but this information may be data having any structure (for example, may be structured data or unstructured data), or may be a learning model that generates an output with respect to an input, the learning model as represented by a neural network, a genetic algorithm, or a random forest. Accordingly, "xxx table" can be referred to as "xxx information." In addition, in the following description, the configuration of each table is an example, and one table may be divided into two or more tables, or the entirety or a portion of two or more tables may be one table.

In addition, in the following description, a function may be described with the expression "yyy unit," but a function may be realized by a processor executing one or more computer programs, may be realized by one or more hardware circuits (for example, an FPGA or an ASIC), or may be realized by a combination of these. In a case where a function is realized by a processor executing a program, because defined processing is performed while appropriately using a storage apparatus and/or an interface apparatus, or the like, the function may be set as at least a portion of a processor. Processing described with a function as a subject may be said to be processing performed by a processor or an apparatus which has the processor. A program may be installed from program source. Program source may be a recording medium (for example, a non-transitory recording medium) that can be read by a computer, or may be a program distribution computer having a non-transitory recording device connected to a network, for example. Description of each function is an example, and a plurality of functions may be combined into one function, or one function may be divided into a plurality of functions.

In addition, in the following description, a common symbol from among reference symbols is used in a case where description is given without distinguishing elements of the same kind, and reference symbols may be used in a case where elements of the same kind are distinguished.

Description is given below for several embodiments. Note that, in the following description, the following terms are employed.

Local 5G is taken as an example of a communication service in which a U-plane and a C-plane are required. However, the present invention can also be applied to provision of a communication service other than local 5G, for example to provision of a future mobile communication standard such as private LTE or 6G.

A "communication carrier" is an example of at least one of a business operator having wireless communication network equipment (for example, a MNO) and a business operator that does not have wireless communication network equipment (for example, a MVNO), for example, is a business operator that provides a communication service for communication between sites, and typically is a business operator that provides a wide area network (WAN) such as wide area Ethernet network ("Ethernet" is a registered trademark). For example, depending on the country, MNO may be excluded from communication carriers which are able to provide local 5G.

A "user" is a customer of a communication carrier. A "user" is typically an organization but may be an individual.

A "user terminal" is an example of user equipment (UE), and is a user's information processing terminal. A user terminal may be an information processing terminal owned by or loaned to a user or a party concerned. A party concerned for a user may be an employee or customer of the user, for example.

A "user server" is a server that is a communication counterpart for a user terminal, and communicates with the user terminal.

A "user site" is a site that a user uses. Whether or not a user site is a site owned by a user is not questioned.

A "user site (1)" is an example of a first user site, and is a site that communicates with a user terminal and has an antenna and a base station (hereinafter, it is assumed that a base station includes an antenna). There may be one or more user sites (1) for each user. In order to simplify the description, there is one user site (1) for each user below. A "user site (α1)" is the user site (1) for a user α.

A "user site (2)" is an example of a second user site, and is a site that has a user server. There may be one or more user sites (2) for each user, or there may be a common user site (2) for a plurality of users. In order to simplify the description, there is one user site (2) for each user below. A "user site (α2)" is the user site (2) for the user a.

A "carrier site" is a site used by a communication carrier. Whether or not a carrier site is owned by a communication carrier is not questioned. For example, a carrier site may be a carrier equipment building.

A "C-plane site" is any site that is not a user site, and on which a C-plane is installed. In the following embodiments, a carrier site also serves as a C-plane site.

A "U-plane" is a user plane, and specifically is a function group (one or more functions) for transferring user data. In the following embodiments, a U-plane is realized as an apparatus (for example, one or more devices), but may be a function group in the apparatus. A U-plane realized as an apparatus may be referred to as a "U-plane apparatus."

A "C-plane" is a control plane, and specifically is a function group (one or more functions) that performs at least one among authentication of a user terminal and control pertaining to session management. As control performed by a C-plane, for example there are control pertaining to authentication for connecting a mobile terminal (for example, a user terminal or a carrier terminal which is described below), or control pertaining to a handover that accompanies movement of a mobile terminal. In the following embodiments, a C-plane is realized as an apparatus (for example, one or more devices), but may be a function group in the apparatus. A C-plane realized as an apparatus may be referred to as a "C-plane apparatus."

A "M-plane" is a management plane, and specifically is a function group (one or more functions) used for settings or management. An M-plane may be realized as an apparatus (for example, one or more devices), or may be a function group in an apparatus. An M-plane realized as an apparatus may be referred to as a "M-plane apparatus."

A "communication apparatus" is an apparatus that switches between apparatuses connected to the communication apparatus in a site. For example, any of L2 and L3 may be employed as a layer for switching. Note that there is an apparatus that performs switching for relaying communication in a wide area network (for example, a wide area network (WAN)) outside of a site. This apparatus is referred to as a "transport apparatus" in the following description.

First Embodiment

Figure 2:
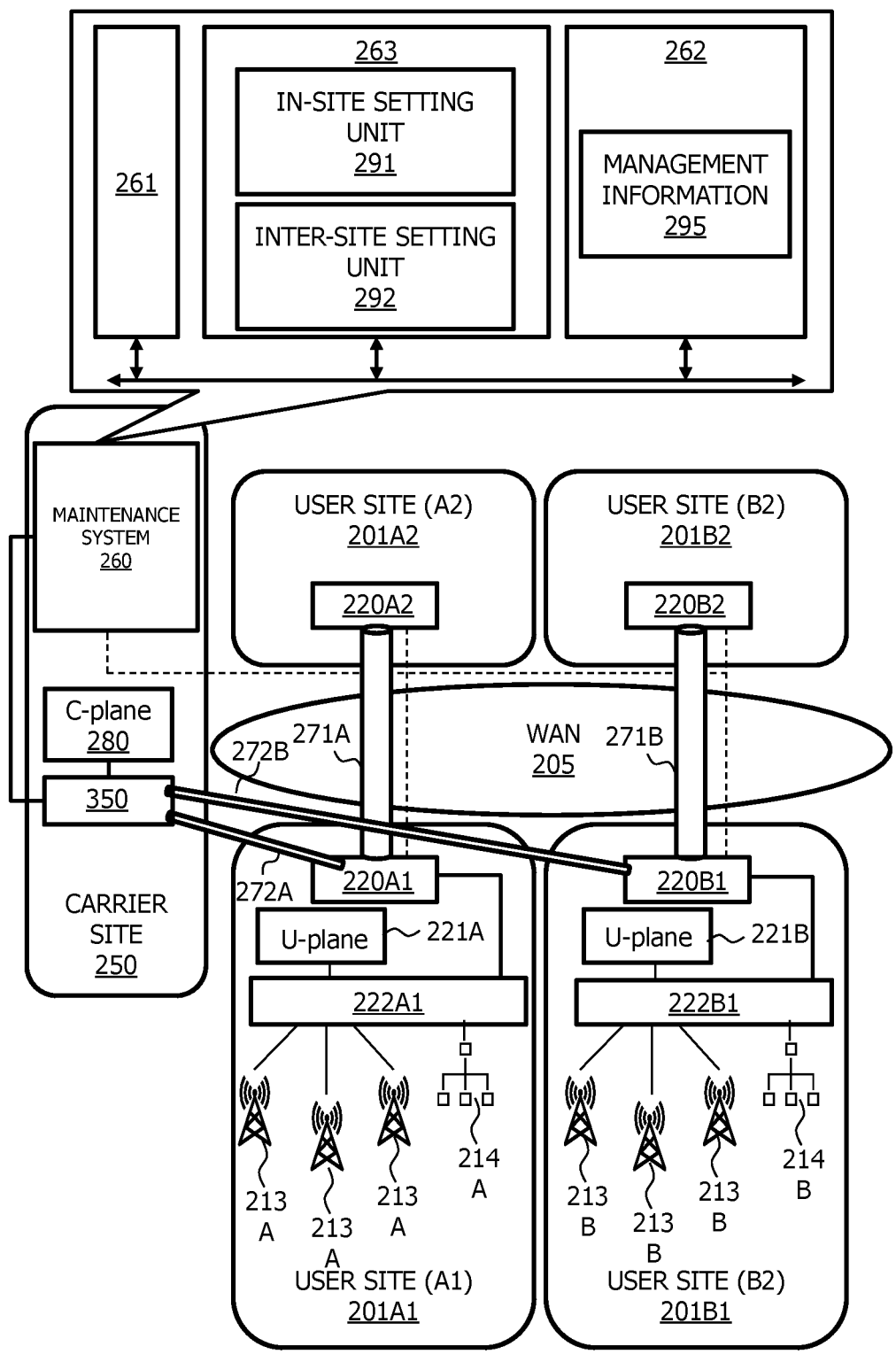
FIG. 2 illustrates an outline of a first embodiment.

FIG. 2 illustrates an outline of a first embodiment.

A user A and a user B, for example, are customers of a communication carrier. Taking the user A as an example, description is given for user sites (1) and (2). Although user sites for all users do not need to be the same, in the present embodiment, user sites for the user A and the user (B) have the same configuration in order to simply the description.

There are a user site (A1) 201A1 and a user site (A2) 201A2. Communication between the user site (A1) 201A1 and the user site (A2) 201A2 is performed via a WAN 205 (for example, a wide area Ethernet network). A communication service that a communication carrier provides to the user A is communication via the WAN 205.

The user site (A1) 201A1 has base stations 213A (base station includes an antenna for sending and receiving radio waves), a LAN 214A, a communication apparatus 222A, a U-plane 221A, and a line terminal apparatus 220A1. The base stations 213A, the LAN 214A (which is typically connected by wire to devices such as a server or personal computer in the user site (A1) 201A1), the U-plane 221A, and the line terminal apparatus 220A1 are connected to the communication apparatus 222A.

The user site (A2) 201A2 has, for example, a line terminal apparatus 220A2 or a server for data analysis (not illustrated). A line terminal apparatus in a user site is referred to below as a "user termination apparatus."

There is a carrier site 250. The carrier site 250 has a maintenance system 260, a C-plane 280, and a line terminal apparatus 350. The line terminal apparatus in the carrier site 250 is referred to below as a "carrier termination apparatus."

The maintenance system 260 is an example of a communication support system. The maintenance system 260 may be a system that is configured by one or more physical computers, or may be a system (for example, a cloud computing system) that is realized on a physical computational resource group (for example, cloud infrastructure).

The maintenance system 260 has an interface apparatus 261, a storage apparatus 262, and a processor 263 connected to these. The interface apparatus 261 is connected to the WAN 205, for example. The storage apparatus 262 stores a computer program or information (for example, management information 295). An inter-site setting unit 291 and an in-site setting unit 292 are realized by the processor 263 executing the computer program in the storage apparatus 262.

On the basis of the management information 295, the inter-site setting unit 291 sets an inter-site path via the WAN 205. An "inter-site path" is a communication path that connects sites (specifically, line terminal apparatuses in sites). In the following description, an inter-site path is referred to as a "tunnel" for convenience. As tunnels, there are U-plane tunnels 271 through which a U-plane 221 transmits and receives data, and C-plane tunnels 272 through which the C-plane 280 transmits and receives signals. A U-plane tunnel 271A is established between user termination apparatuses 220A1 and 220A2, and a U-plane tunnel 271B is established between the user termination apparatuses 220B1 and 220B2. A C-plane tunnel 272A is established between the user termination apparatus 220A1 and a carrier termination apparatus 350, and a C-plane tunnel 272B is established between the user termination apparatus 220B1 and the carrier termination apparatus 350.

The in-site setting unit 292 sets an in-site communication path which is a communication path within a user site (1). The in-site communication path is connected, through a tunnel, to an in-site communication path within another site.

By virtue of the present embodiment, a U-plane 221 among core equipment is installed in the user site (1) for each user, and the C-plane 280 among core equipment is installed in the carrier site 250 which is external to the user site (1) for each user, and is shared by each user. Accordingly, it is possible to reduce the cost of equipment installed at the user sites (1). In addition, in transmission and reception of user data between user sites, there is no need to output user data to a site that is outside a user site, and it is possible to realize low-latency communication. In addition, since a communication carrier is a business operator that provides communication via the WAN 205 as a communication service, even if a communication failure occurs in the carrier site 250, connected user terminals can continue local 5G communication. In addition, it is possible to suppress communication costs because the amount of data between the C-plane 280 and each user site (1) which goes via a C-plane tunnel 272 is small. Note that, as described above, in the present embodiment, the carrier site 250 is an example of a C-plane site, but a C-plane site may be any site other than a user site 201 and the carrier site 250.

Figure 3:
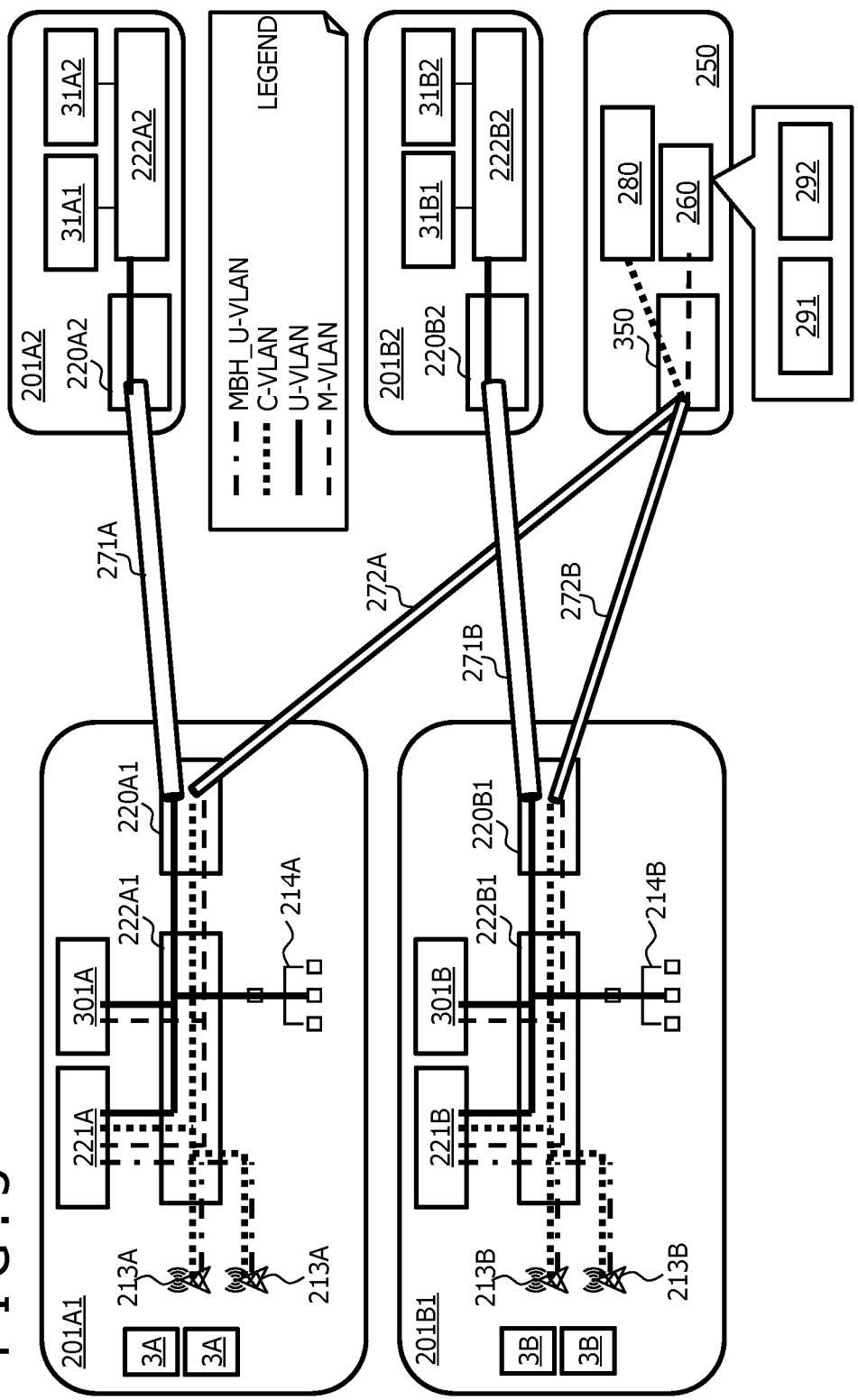
FIG. 3 illustrates an example of an overall configuration of a system according to the first embodiment.

FIG. 3 illustrates an example of an overall configuration of a system according to the first embodiment.

Description regarding user sites (1) and (2) takes the user site (A1) 201A1 and the user site (A2) 201A2 as examples.

The user site (A2) 201A2 has a user termination apparatus 220A2, one or more servers 31A (for example, two servers: servers 31A1 and 31A2), and a communication apparatus 222A2. The user termination apparatus 220A2 and the servers 31A are connected to the communication apparatus 222A2. Communication within the user site (A2) 201A2 is performed via the communication apparatus 222A2.

The user site (A1) 201A1 has base stations 213A, a user termination apparatus 220A1, a U-plane 221A, an edge server 301A, a LAN 214A, and a communication apparatus 222A1. The base stations 213A, the user termination apparatus 220A1, the U-plane 221A, the edge server 301A, and the LAN 214A are connected to the communication apparatus 222A1. Communication within the user site (A1) 201A1 is performed via the communication apparatus 222A1.

The carrier site 250 has the carrier termination apparatus 350, the C-plane 280, and the maintenance system 260. In the example illustrated by FIG. 3, the C-plane 280 and the maintenance system 260 are connected to the carrier termination apparatus 350, but it may be that the carrier termination apparatus 350, the C-plane 280, and the maintenance system 260 are connected to a communication apparatus, not illustrated, and communication within the carrier site 250 is performed via this communication apparatus.

Conventionally, a communication service that is for connecting sites which are provided to the user A and is provided by a communication carrier would be communication between the user site (A1) 201A1 and the user site (A2) 201A2. Accordingly, there would be no communication path for communicably connecting the U-plane 221A in the user site (A1) 201A1 with the C-plane 280 in the carrier site 250. Accordingly, in the present embodiment, the inter-site setting unit 291 in the maintenance system 260 establishes the C-plane tunnel 272A between the user termination apparatus 220A1 and the carrier termination apparatus 350. As a result, communication between the U-plane 221A and the C-plane 280 becomes possible.

In addition, when communication between the U-plane 221A and the C-plane 280 becomes possible, there is the risk that data transmitted and received by the U-plane 221A and signals transmitted and received by the C-plane 280 will mixed in the same communication path in the user site (A1) 201A1. Accordingly, in the present embodiment, the in-site setting unit 292 in the maintenance system 260 sets respectively exclusive in-site communication paths so that these data and signals are not mixed in the same communication path. As a result, it is possible to appropriately perform each of transmission and reception of data by the U-plane 221A, and transmission and reception of signals by the C-plane 280. Specifically, for example, by setting quality of service (QoS) for each in-site communication path, communication in accordance with QoS becomes possible. QoS is an example of a priority. In addition, besides the in-site communication path in the user site (A1) 201A1, because QoS is also set for an in-site communication path of another site which is connected to the in-site communication path in the user site (A1) 201A1 via a tunnel, communication that is in accordance with QoS as a whole becomes possible.

An in-site communication path, for example, may be a virtual LAN (VLAN) or a network address (for example, an IP address). In other words, distinguishing between an in-site communication path for a U-plane and an in-site communication path for a C-plane may be distinguishing VLANs or may be distinguishing IP addresses. In the former case, it is possible to distinguish communication paths in relation to communication via a communication apparatus 222 for which the switching layer is L2. In the latter case, it is possible to distinguish communication paths in relation to communication via a communication apparatus 222 for which the switching layer is L3.

In the present embodiment, a VLAN is employed as an in-site communication path. Specifically, for example, the in-site setting unit 292 sets the following VLANs in the user site (A1) 201A1.

MBH_U-VLAN: a VLAN in which data is transmitted and received between the base stations 213A and the U-plane 221A. The MBH_U-VLAN is connected to the base stations 213A and the U-plane 221A. Note that "MBH" is an abbreviation of mobile backhaul and, in the present embodiment, corresponds to a network that connects the U-plane 221A, which is a part of the core equipment, with the base stations 213A which wirelessly communicate with user terminals 3A.

C-VLAN: a VLAN via which the C-plane 280 transmits and receives signals (for example, a signal for at least one of authentication of a user terminal 3A and session management control). The C-VLAN is connected to the base stations 213A, the U-plane 221A, and the user termination apparatus 220A1.

U-VLAN: a VLAN via which data is transmitted and received between the U-plane 221A and the servers 31A (as well as data which is transmitted and received via the LAN 214A). The U-VLAN is connected to the U-plane 221A, the LAN 214A, the edge server 301A, and the user termination apparatus 220A1. Note that the edge server 301A may be a server within a user site (1) that transmits and receives data via a LAN 214. Furthermore, the edge server 301A may be installed as a virtual machine inside the same server as the U-plane 221A. Between the U-plane 221A and the edge server 301A, which is a virtual machine, may be via the U-VLAN. Data transmitted and received by the edge server 301A may also be via the U-VLAN. The edge server 301A may perform analysis on the basis of data from a user terminal 3A and, on the basis of a result of the analysis, output to the user terminal 3A an instruction for controlling the user terminal 3A.

In addition to the VLANs described above, the in-site setting unit 292 sets an M-VLAN in the user site (A1) 201A1. The M-VLAN is a VLAN via which information is set to apparatuses (for example, apparatuses provided to the user by the communication carrier, such as the apparatuses 221, 301, and 222) within a site by the maintenance system 260. An in-site M-plane is one path within a site. The M-VLAN is connected to the U-plane 221A, the edge server 301A, and the user termination apparatus 220A1. In this manner, by making an in-site communication path through which travel signals for management (for example, a status check) be an independent in-site communication path that is an M-VLAN, it is possible to more appropriately perform each of transmitting and receiving data by the U-plane 221 and transmitting and receiving signals by the C-plane 280. Specifically, for example, by setting a priority such as a QoS for each U-VLAN, C-VLAN, and M-VLAN, communication in accordance with QoS is possible.

In the user site (A2) 201A2, a U-VLAN is connected to the user termination apparatus 220A2. The U-VLAN in the user site (A1) 201A1 and the U-VLAN in the user site (A2) 201A2 are mutually connected via the U-plane tunnel 271A. Note that, in the present embodiment, since the user site (A2) 201A2 has no user terminal 3A, it is not necessary to establish a C-plane tunnel between the user site (A2) 201A2 and the carrier site 250. In addition, the U-VLAN in the user site (A2) 201A2 may be set via an outside-site M-plane 800 (refer to FIG. 8), which is described below.

In the carrier site 250, an M-VLAN is connected to the carrier termination apparatus 350 and the maintenance system 260, and a C-VLAN is connected to the carrier termination apparatus 350 and the C-plane 280. The M-VLAN in the user site (A1) 201A1 and the M-VLAN in the carrier site 250 are mutually connected via the C-plane tunnel 272A. Similarly, the C-VLAN in the user site (A1) 201A1 and the M-VLAN in the carrier site 250 are mutually connected via the C-plane tunnel 272A. Note that a tunnel that the M-VLAN goes via and a tunnel that the C-VLAN goes via may be separately prepared (in other words, in place of the C-plane tunnel 272A, a tunnel that the M-VLAN goes via and a tunnel that the C-VLAN goes via may be prepared). However, as in the example of FIG. 3, it is desirable for the C-plane tunnel 272A to serve as both the tunnel that the M-VLAN goes via and the tunnel that the C-VLAN goes via. This is because the amount of data that goes via a M-VLAN or C-VLAN is smaller than the amount of data that goes via a U-VLAN, and having fewer tunnels established between the carrier site 250 and the user site (1) for one user means less effort required to set or manage them.

In the present embodiment, the C-plane tunnel 272A, which connects the user site (1) with the carrier site 250, and the plurality of VLANs which are distinguished in the user site (1) depend on information set in the user termination apparatus 220, the carrier termination apparatus 350, and the communication apparatus 222. In other words, the C-plane tunnel 272A and each VLAN are realized as a result of information being set to the user termination apparatus 220, the carrier termination apparatus 350, and the communication apparatus 222.

Figure 4:
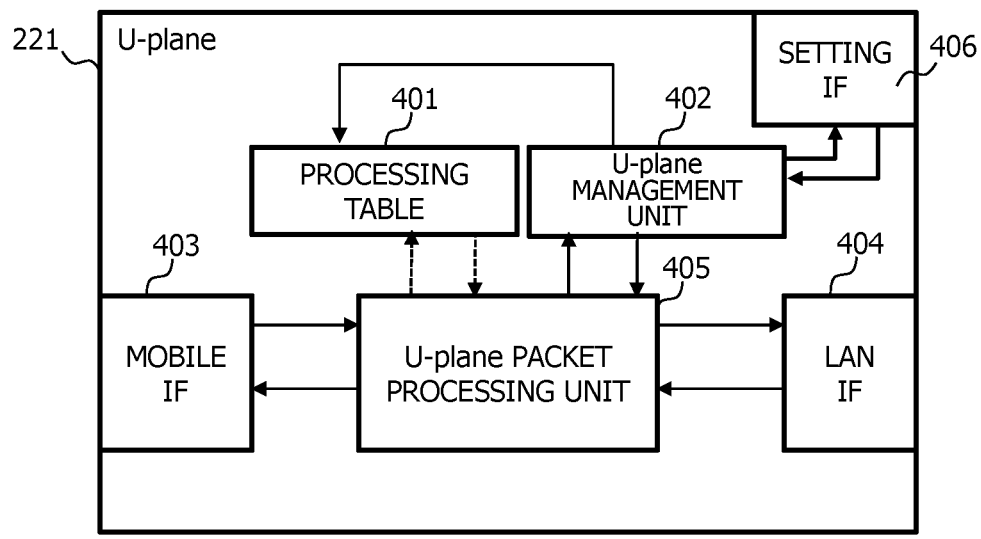
FIG. 4 illustrates an example of a configuration of a U-plane.

FIG. 4 illustrates an example of a configuration of a U-plane 221.

A U-plane 221 has a processing table 401, a U-plane management unit 402, a mobile interface (IF) 403, a LAN IF 404, a U-plane packet processing unit 405, and a setting IF 406. The processing table 401 may be stored in a storage apparatus, not illustrated, inside the U-plane 221. The U-plane management unit 402 may be realized by a processor, not illustrated, in the U-plane 221 executing a computer program. The U-plane packet processing unit 405 may be realized by a hardware circuit.

The mobile IF 403 and the LAN IF 404 are each a physical interface device (for example, a physical port).

The mobile IF 403 is connected to a base station 213 via a communication apparatus 222. The mobile IF 403 transmits and receives packets in a mobile communication packet format to and from the base station 213.

The LAN IF 404 is connected to the user termination apparatus 220 via the communication apparatus 222. The LAN IF 404 encapsulates a packet which is to be transmitted to or is received from the base station 213 with a header, and transmits or receives the encapsulated packet. Note that, in the second embodiment, there is a carrier terminal in addition to a user terminal as mobile terminals in a user site (1), but packets to which a mobile header has been added are transmitted and received unchanged for carrier terminal packets.

The U-plane management unit 402 manages the U-plane 221. For example, the U-plane management unit 402 sets the processing table 401 (for example, an uplink processing table 401U and a downlink processing table 401D described below) on the basis of setting information (for example, information specified from a packet received via an M-VLAN and via the U-plane packet processing unit 405). The setting may be performed via the U-plane packet processing unit 405, or may be performed without going via the U-plane packet processing unit 405. In addition, the U-plane management unit 402 transmits status information representing the status of the U-plane 221 to the C-plane 280.

The processing table 401 is referred to for processing of packets that the U-plane 221 transmits and receives. Transmission of a packet to a server 31 is "uplink communication" and transmission of a packet from a server 31 is "downlink communication." As the processing table 401, there is an uplink processing table for processing uplink communication, and a downlink processing table for processing downlink communication.

The U-plane packet processing unit 405 receives a packet via the mobile IF 403 or the LAN IF 404, and processes the received packet on the basis of the processing table 401. For example, in a case where a packet that goes via the M-VLAN is received by the LAN IF 404, the U-plane packet processing unit 405 transfers the packet to the U-plane management unit 402. Details of processing performed by the U-plane packet processing unit 405 are described below.

The setting IF 406 is an interface device that packets flowing in the M-VLAN go via. For example, it may be that a management terminal (for example, a personal computer) is connected on-site to the setting IF 406, and the table 401 is set from the management terminal. In addition, information from within the U-plane 221 (for example, statistic information or apparatus failure information) may be collected by the management terminal or the maintenance system 260, via the setting IF 406.

Figure 5:
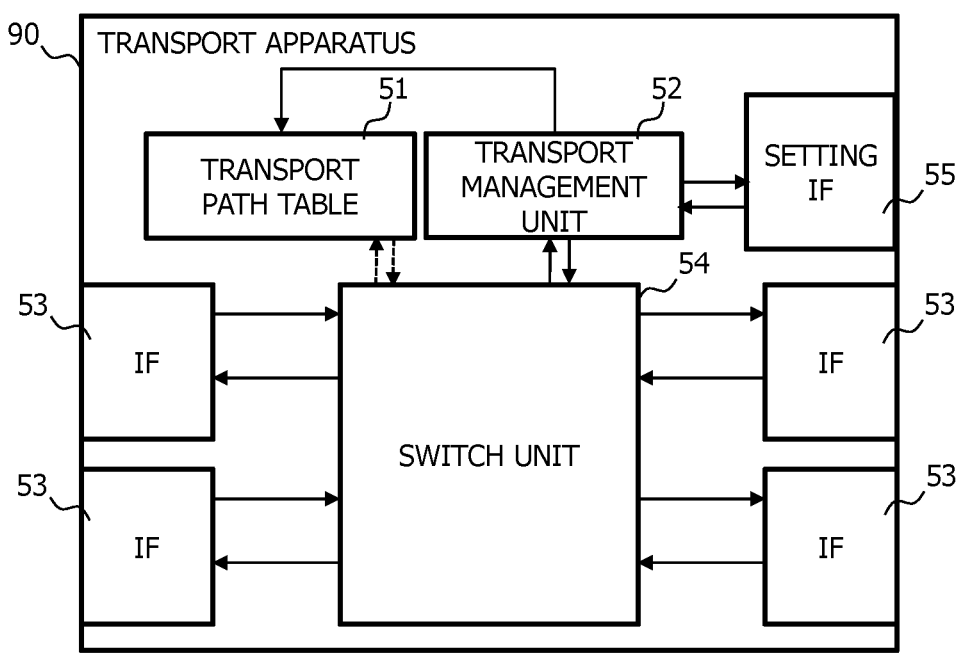
FIG. 5 illustrates an example of a configuration of a transport apparatus.

FIG. 5 illustrates an example of a configuration of a transport apparatus 90.

The transport apparatus 90 has a transport path table 51, a transport management unit 52, a plurality of IFs 53, a switch unit 54, and a setting IF 55. The transport path table 51 may be stored in a storage apparatus, not illustrated, inside the transport apparatus 90. The transport management unit 52 may be realized by a processor, not illustrated, in the transport apparatus 90 executing a computer program. The switch unit 54 may be realized by a hardware circuit.

The IFs 53 and the setting IF 55 are each a physical interface device (for example, a physical port).

The IFs 53 are interface devices that packets flowing through the WAN 205 go via.

The setting IF 55 is an interface device that packets flowing in the outside-site M-plane 800 go via. For example, the table 51 may be set via the setting IF 55. In addition, information from within the transport apparatus 90 (for example, statistic information or apparatus failure information) may be collected by the maintenance system 260, via the setting IF 55.

The transport path table 51 is a table that represents paths, and specifically, for example, represents a relation between a tunnel (271, 272) (for example, another transport apparatus that the tunnel goes via), and an IF 53.

The transport management unit 52 manages the transport apparatus 90. For example, upon receiving a setting packet from the switch unit 54 or the setting IF 55, the transport management unit 52 sets the transport path table 51 on the basis of information (for example, setting information) represented by the packet.

The switch unit 54 performs switching processing on the basis of the transport path table 51. Specifically, the switch unit 54 switches packets from an input IF 53 to an output IF 53. In addition, the switch unit 54 receives a setting packet from an outside-site M-plane, which is described below, and transfers the setting packet to the transport management unit 52.

Figures 19, 20, 21:
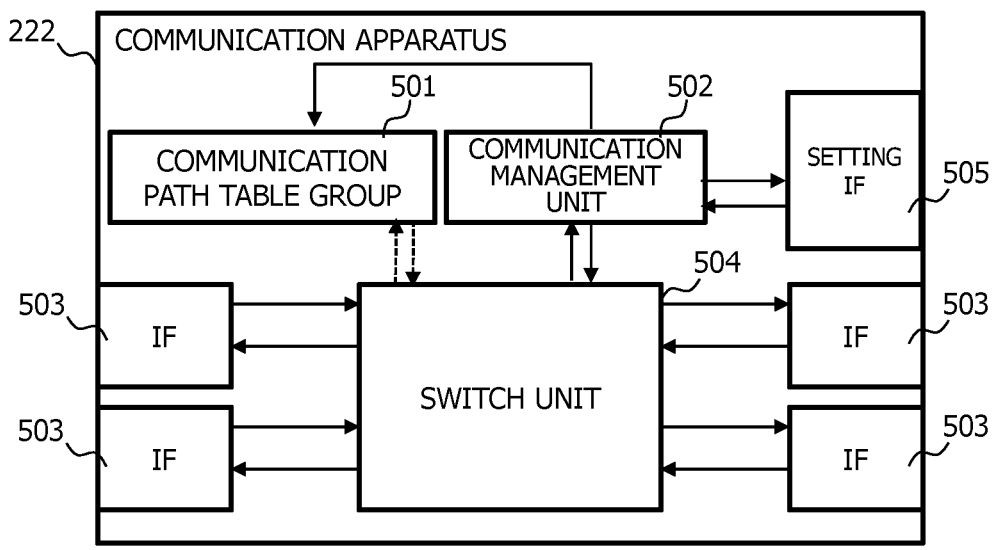
FIG. 19 illustrates an example of a configuration of a communication apparatus.
FIG. 20 illustrates an example of a configuration of a first communication path table.
FIG. 21 illustrates an example of a configuration of a second communication path table.

FIG. 19 illustrates an example of a configuration of a communication apparatus 222.

The communication apparatus 222 has a communication path table group 501, a communication management unit 502, a plurality of IFs 503, a switch unit 504, and a setting IF 505. The communication path table group 501 may be stored in a storage apparatus, not illustrated, inside the communication apparatus 222. The communication management unit 502 may be realized by a processor, not illustrated, in the communication apparatus 222 executing a computer program. The switch unit 504 may be realized by a hardware circuit.

The IFs 503 and the setting IF 505 are each a physical interface device (for example, a physical port).

Each IF 503 is an interface device that packets flowing through one of an MBH_U-VLAN, a C-VLAN, and a U-VLAN go via. A connection destination of each IF 503 may be any of a base station 213, a U-plane 221, an edge server 301, a LAN 214, and a user termination apparatus 220. The base station 213, the U-plane 221, the edge server 301, the LAN 214, and the user termination apparatus 220 are connected to the plurality of IFs 503.

The setting IF 505 is an interface device that packets flowing in the M-VLAN go via. For example, it may be that a management terminal is connected on-site to the setting IF 505, and the table group 501 is set from the management terminal. In addition, information from within the U-plane 221 (for example, statistic information or apparatus failure information) may be collected by the management terminal or the maintenance system 260, via the setting IF 406.

The communication path table group 501 is a table group that represents paths, and specifically represents a relation between VLANs and IFs 503.

The communication management unit 502 manages the communication apparatus 222. For example, upon receiving a setting packet from the switch unit 504 or the setting IF 505, the communication management unit 502 sets the communication path table group 501 on the basis of information (for example, setting information) represented by the packet. In addition, the communication management unit 502 may transmit information regarding the communication apparatus 222 (for example, statistic information or apparatus failure information) to the maintenance system 260 via the setting IF 505, for example.

The switch unit 504 performs switching processing on the basis of the communication path table group 501. Specifically, for example, the switch unit 504 switches packets from an input IF 503 to an output IF 503. In addition, the switch unit 504 receives a setting packet from an outside-site M-plane, which is described below, and transfers the setting packet (for example, a packet for setting the table group 501) to the communication management unit 502.

FIG. 20 illustrates an example of a configuration of a first communication path table.

A first communication path table 2000 is one table in the communication path table group 501. The first communication path table 2000 is a VLAN setting table for each IF 503. The first communication path table 2000 has a record for each IF 503. Each record has information such as an IF-ID 2001, an IF mode 2002, and a V-ID 2003. One IF 503 is taken as an example ("target IF 503" in the description of FIG. 20).

The IF-ID 2001 represents an ID of the target IF.

The IF mode 2002 represent a mode of the target IF. A mode "access" means a state in which there is no tag from the target IF 503 to outside. A packet received from an IF 503 in the mode "access" has no tag, and the packet is transferred with a tag added thereto by a designated V-ID. In a mode "trunk," packets with a V-ID are transmitted and received via the target IF 503. An IF 503 in the mode "trunk" can only use packets with the V-ID designated as the V-ID 2003 corresponding to the IF 503.

FIG. 21 illustrates an example of a configuration of a second communication path table.

A second communication path table 2100 is one table in the communication path table group 501. The second communication path table 2100 is a table for determining an output IF 503 from a destination MAC address of a received packet. The second communication path table 2100 may be automatically learned by a communication apparatus 222 (for example, a layer 2 (L2) switch) in a user site 201. For example, this learning may be referred to as transmission source MAC address learning, and, when a packet is received, the relation between the ID of the receiving IF 503, the V-ID (VLAN ID) of the packet, and the transmission source MAC address for this time may be learned. By this learning, it may be recognized that an apparatus having the previously-described VLAN and MAC address is beyond the IF 503 that has received the packet. Information obtained in this manner may be registered in the second communication path table 2100. In the record, a destination MAC 2101 may be information representing the transmission source MAC address. A V-ID 2102 may be information representing the V-ID attached to the received packet. An IF-ID 2103 may be information representing an ID of the IF 503 that received the packet. An L2 switch may, upon receiving a packet, refer to the table 2100 and copy and transfer the packet to all IFs 503 corresponding to the VLAN the packet belongs to in the case where there is no record for the corresponding MAC address. The first communication path table 2000 may be used in order to copy and transfer the packet. For example, in a case where a communication apparatus 222 receives a packet having a V-ID not in the second communication path table 2100 via an IF 503 with the IF-ID "3," the communication apparatus 222 may copy this packet adding the V-ID "100" (the V-ID corresponding to the IF-ID "3" in the first communication path table 2000) to the copied packet, and transfer the packet having this V-ID to the IFs 503 with the IF-IDs "1" and "2" (IF-IDs corresponding to the V-ID "100" in the second communication path table 2100). In addition, the transmission source MAC address for this time, the V-ID in the first communication path table 2000, and the IF-ID of the receiving IF may be registered in the second communication path table 2100.

Figure 6:
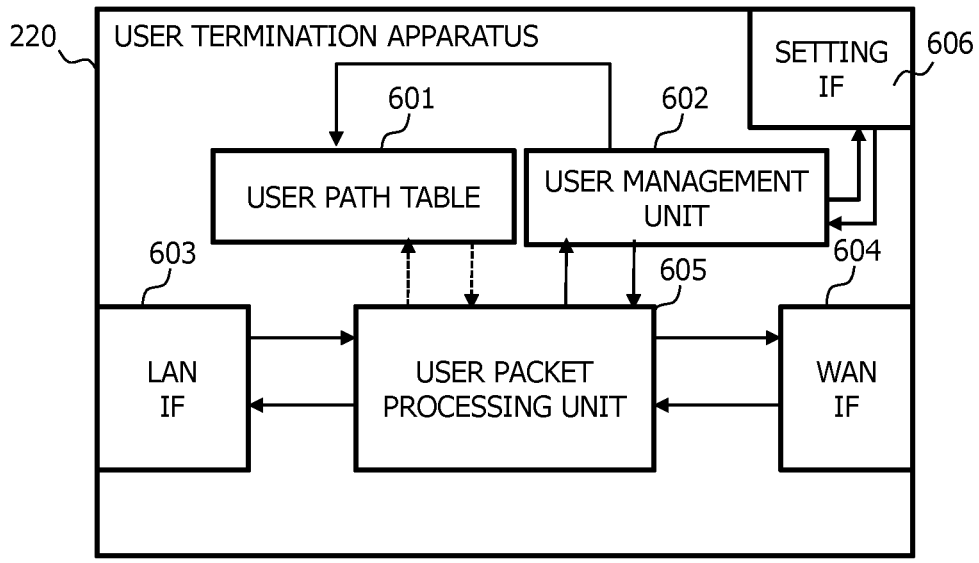
FIG. 6 illustrates an example of a configuration of a user termination apparatus.

FIG. 6 illustrates an example of a configuration of a user termination apparatus 220.

The user termination apparatus 220 has a user path table 601, a user management unit 602, a LAN IF 603, a WAN IF 604, a user packet processing unit 605, and a setting IF 606. The user path table 601 may be stored in a storage apparatus, not illustrated, inside the user termination apparatus 220. The user management unit 602 may be realized by a processor, not illustrated, in the user termination apparatus 220 executing a computer program. The user packet processing unit 605 may be realized by a hardware circuit.

The LAN IF 603 and the WAN IF 604 are each a physical interface device (for example, a physical port).

The LAN IF 603 is connected to an IF 503 of a communication apparatus 222. The WAN IF 604 is connected to the WAN 205.

The user path table 601 is a table that represents paths, and specifically represents a relation between VLANs and tunnels (271 and 272).

The user management unit 602 manages the user termination apparatus 220. For example, upon receiving a setting packet from the maintenance system 260 via the WAN IF 604, the user management unit 602 sets the user path table 601 on the basis of information (for example, setting information) represented by the packet. In addition, the user management unit 602 may transmit information (for example, statistic information or apparatus failure information) regarding the user termination apparatus 220 to the maintenance system 260.

The user packet processing unit 605 receives a packet via the LAN IF 603 or the WAN IF 604, and processes the received packet on the basis of the user path table 601. Details of processing performed by the user packet processing unit 605 are described below.

The setting IF 606 is an interface device that packets flowing in the M-VLAN go via. For example, it may be that a management terminal is connected on-site to the setting IF 606, and the table 601 is set from the management terminal. In addition, information from within the user termination apparatus 220 (for example, statistic information or apparatus failure information) may be collected by the management terminal or the maintenance system 260, via the setting IF 606.

Figure 7:
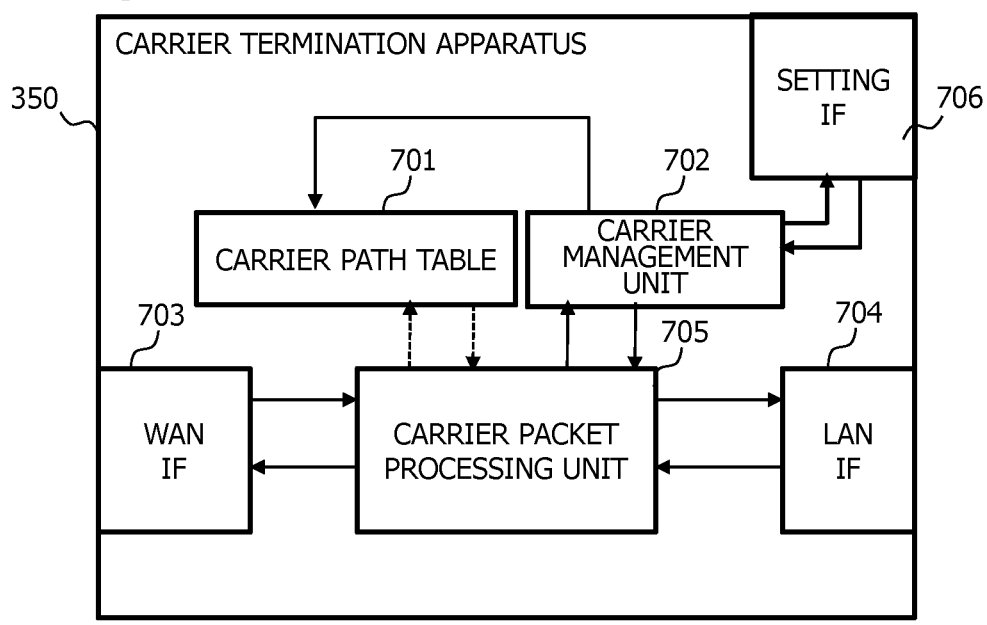
FIG. 7 illustrates an example of a configuration of a carrier termination apparatus.

FIG. 7 illustrates an example of a configuration of the carrier termination apparatus 350.

The carrier termination apparatus 350 has a carrier path table 701, a carrier management unit 702, a WAN IF 703, a LAN IF 704, a carrier packet processing unit 705, and a setting IF 706. The carrier path table 701 may be stored in a storage apparatus, not illustrated, inside the carrier termination apparatus 350. The carrier management unit 702 may be realized by a processor, not illustrated, in the carrier termination apparatus 350 executing a computer program. The carrier packet processing unit 705 may be realized by a hardware circuit.

The WAN IF 703, the LAN IF 704, and the setting IF 706 are each a physical interface device (for example, a physical port).

The WAN IF 703 is connected to the WAN 205. The LAN IF 704 is connected to the maintenance system 260 and the C-plane 280. The setting IF 706 is connected to the maintenance system 260.

The carrier path table 701 is a table that represents paths, and specifically represents a relation between a VLAN and a tunnel (271, 272).

The carrier management unit 702 manages the carrier termination apparatus 350. For example, upon receiving a setting packet from the maintenance system 260 via the LAN IF 704 or the setting IF 706, the carrier management unit 702 sets the carrier path table 701 on the basis of information (for example, setting information) represented by the packet. In addition, the carrier management unit 702 may transmit information (for example, statistic information or apparatus failure information) regarding the carrier termination apparatus 350 to the maintenance system 260.

The carrier packet processing unit 705 receives a packet via the WAN IF 703 or the LAN IF 704, and processes the received packet on the basis of the carrier path table 701. Details of processing performed by the carrier packet processing unit 705 are described below.

For example, it may be that a management terminal is connected on-site to the setting IF 706, and the table 701 is set from the management terminal. In addition, information from within the carrier termination apparatus 350 (for example, statistic information or apparatus failure information) may be collected by the management terminal or the maintenance system 260, via the setting IF 706.

Figure 8:
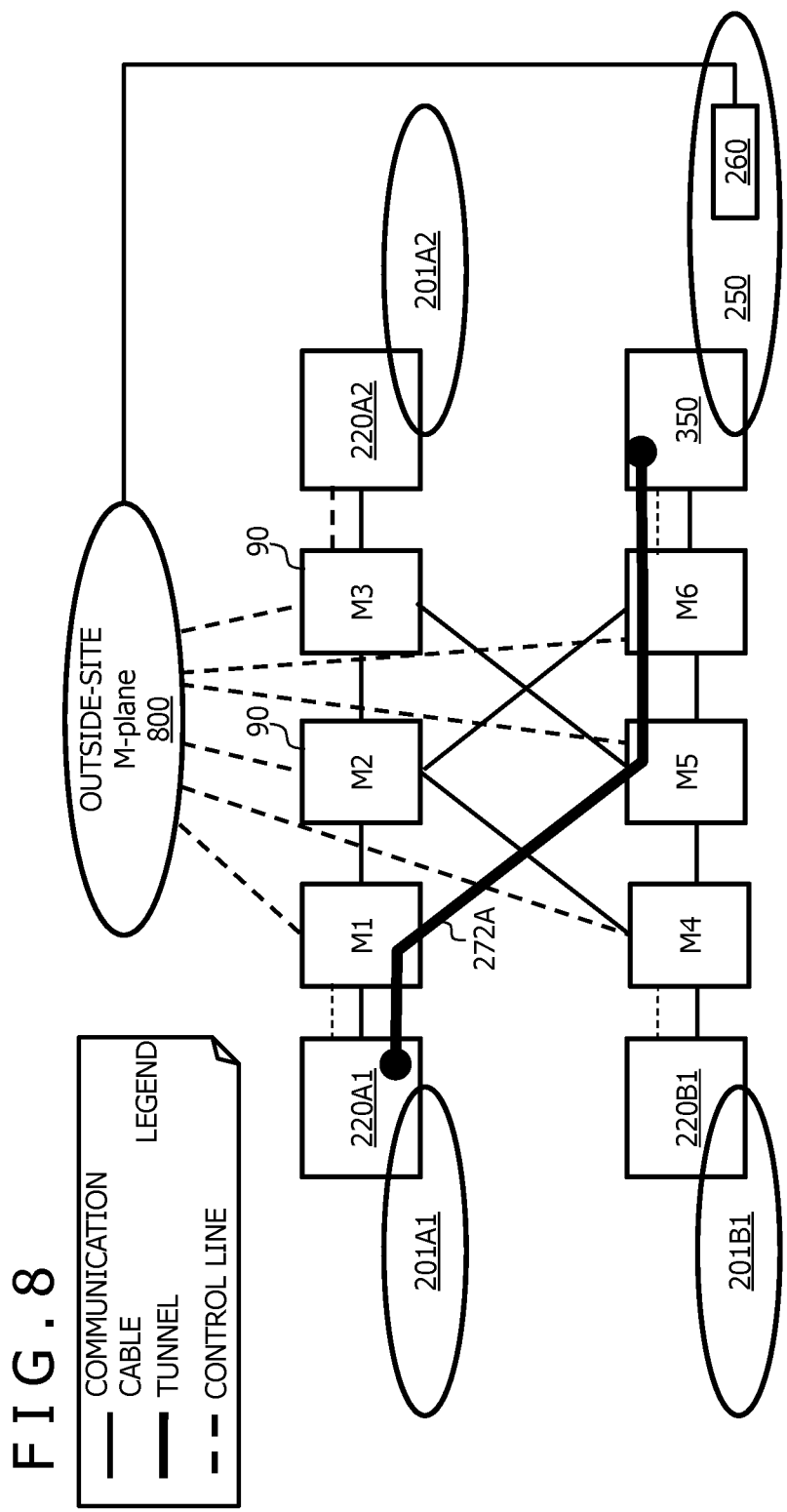
FIG. 8 illustrates an example of constructing a tunnel via an outside-site M-plane.

FIG. 8 illustrates an example of constructing a tunnel via an outside-site M-plane.

As described above, since a communication service that a communication carrier provides to a user is communication between user sites, there is no communication path for communicably connecting the U-plane 221 in a user site (1) and the C-plane 280 in a carrier site 250.

The WAN 205 (an example of a dedicated user line provided by a communication carrier) provided by the communication carrier has the outside-site M-plane 800, and a plurality of transport apparatuses 90 which are communicably connected to the outside-site M-plane 800. The outside-site M-plane 800 is a path which is present outside of the user sites 201 and the carrier site 250. The transport apparatuses 90 are apparatuses that relay (transfer) packets.

In the present embodiment, the inter-site setting unit 291 in the maintenance system 260 sets C-plane tunnels 272 via the outside-site M-plane 800. According to the example illustrated in FIG. 8, the C-plane tunnel 272A which connects the user termination apparatus 220A1 in the user site (A1) 201A1 with the carrier termination apparatus 350 in the carrier site 250 is set. The C-plane tunnel 272A goes via each of transport apparatuses M1, M5, and M6. In setting of a tunnel that goes via the outside-site M-plane 800, setting of information (for example, setting of the transport path table 51) is performed with respect to a transport apparatus 90, which is an intermediate node in the tunnel that is set, and, via a transport apparatus (or from the outside-site M-plane 800 without going via a transport apparatus), setting of information (for example, setting of the user path table 601 or the carrier path table 701) is performed with respect to the line terminal apparatuses 220 and 350 which are the two end nodes of the tunnel 272A. Setting of information to an apparatus in a user site (1) that is not a line terminal apparatus 220 is performed from the maintenance system 260 and via a C-plane tunnel 272 (in a case where C-plane tunnels 272 are distinguished between tunnels for C-planes and tunnels for M-planes, a tunnel for an M-plane), a user termination apparatus 220, and an M-VLAN, and the outside-site M-plane 800 is not used.

It is possible to associate any QoS with the tunnel. A C-plane tunnel 272 is set in addition to a user tunnel 271. A QoS associated with a C-plane tunnel 272 is higher than a QoS associated with a user tunnel 271. It is considered that, when there is a large amount of user data, communication with a user terminal will be affected as a result of control data being discarded. Since the QoS for the C-plane tunnel 272 is higher than the QoS of the user tunnel 271, it is possible to reduce the possibility of such a defect from occurring. Note that, the same QoS as the QoS of a tunnel may be set by the in-site setting unit 292 as the QoS of a VLAN associated with the tunnel. In addition, for example, in a case where C-plane tunnels 272 are distinguished between tunnels for C-planes or tunnels for M-planes as described above and different QoS are set to these tunnels, finer QoS communication control is expected.

In addition, after a C-plane tunnel 272 is set, an M-VLAN may be set in a user site (1) via the outside-site M-plane 800. Subsequently, settings of tables or the like with respect to apparatuses (for example, 221, 222, and 301) in a user site (1) may be performed from the maintenance system 260 via the C-plane tunnel 272 (or an M-plane tunnel) and the M-VLAN.

Figure 9:
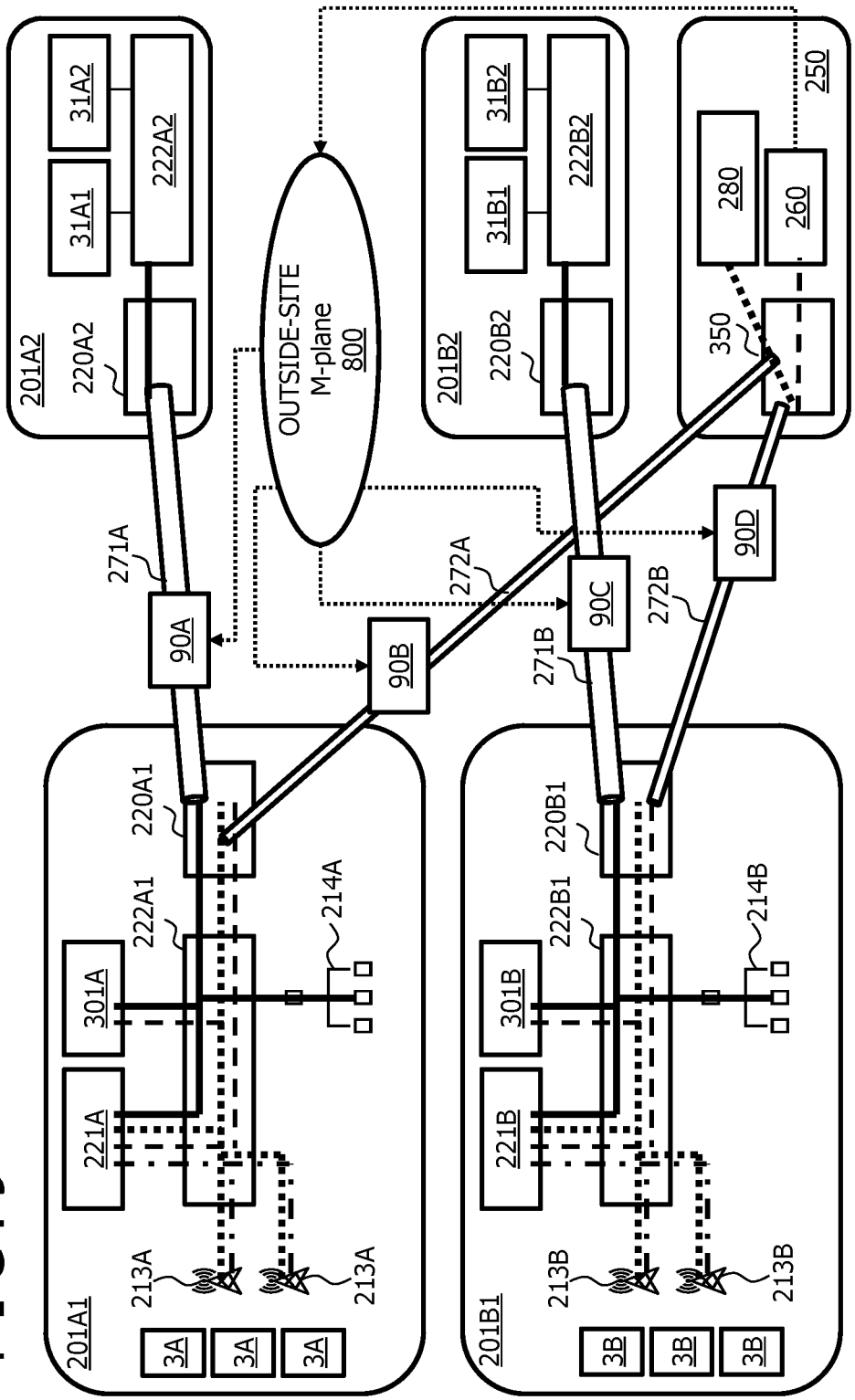
FIG. 9 illustrates an example of constructing a tunnel via an outside-site M-plane.

FIG. 9 illustrates an example in which tunnels 271A, 272A, 271B, and 272B are set via the outside-site M-plane 800.

As exemplified in FIG. 9, the inter-site setting unit 291 in the maintenance system 260 accesses a plurality of transport apparatuses 90 including transport apparatuses 90A through 90D via the outside-site M-plane 800 to thereby set the tunnels 271A, 272A, 271B, and 272B. Subsequently, the in-site setting unit 292 in the maintenance system 260 sets information to apparatuses in a user site (1) via a C-plane tunnels 272. In addition, the in-site setting unit 292 sets information to apparatuses in the carrier site 250.

FIG. 10 illustrates an example of a configuration of the transport path table 51.

The transport path table 51 has a record for each tunnel. Each record has information such as a T-ID 1001, an IF-ID 1002, and IF-ID 1003, and a QoS 1004. One tunnel is taken as an example ("target tunnel" in the description of FIG. 10).

The T-ID 1001 represents the ID of the target tunnel. The IF-ID 1002 represents the ID of one IF 53 with respect to which packets are, via the target tunnel, inputted to and outputted from. The IF-ID 1003 represents the ID of another IF 53 with respect to which packets are, via the target tunnel, inputted to and outputted from. The QoS 1004 represents a QoS as the priority of communication via the target tunnel. The larger the value of the QoS, the higher the priority and the higher the frequency of packet output.

According to the example illustrated in FIG. 10, a packet that goes via a tunnel with the T-ID 1001 of "1," goes via the IF 53 with the IF-ID 1002 of "1" and the IF 53 with the IF-ID 1003 of "2," via the switch unit 54. The switch unit 54 controls switching on the basis of the QoS represented in the transport path table 51.

FIG. 11 illustrates an example of a configuration of the user path table 601. The user path table 601, for example, may be set from the in-site setting unit 292 in the maintenance system 260, via the outside-site M-plane 800.

The user path table 601 has a record for each VLAN connected to the user termination apparatus 220. Each record has information such as a V-ID 1101, a T-ID 1102, and a QoS 1103. One VLAN is taken as an example ("target VLAN" in the description of FIG. 11).

The V-ID 1101 represents an ID for the target VLAN. The T-ID 1102 represents an ID of a tunnel to which the target VLAN is connected. The QoS 1103 represents a QoS as the priority of communication via the target VLAN. Note that a QoS may be handed over between networks with different settings. For example, in the site, a QoS may be set as a class of service (COS) value of a VLAN, and this CoS value may be handed over by being set as a QoS value in a header or a label in the WAN 205. The name of a field for handing over QoS may differ in accordance with the type of tunnel.

According to the example illustrated in FIG. 11, a VLAN with the V-ID 1101 of "1" is connected to a tunnel with the T-ID 1102 of "1."

The user packet processing unit 605 in the user termination apparatus 220 performs packet processing on the basis of a QoS represented in the user path table 601. For example, the following processing is performed.

The user packet processing unit 605, in a case of receiving a packet which has been received via the LAN IF 603, specifies the T-ID 1102 corresponding to the V-ID 1101 of the VLAN that the packet has gone via. The user packet processing unit 605 encapsulates the packet (applies a tunnel header which includes the value of the specified T-ID 1102 to the packet), and outputs the encapsulated packet to the tunnel with the T-ID 1102 from the WAN IF 604.

The user packet processing unit 605, in a case of receiving a packet that has been received via the WAN IF 604, decapsulates the packet, and specifies the V-ID 1101 corresponding to the T-ID 1102 of the tunnel that the packet has gone via. The user packet processing unit 605 outputs this packet to the VLAN with the specified V-ID 1101 from the LAN IF 603.

The user packet processing unit 605, in a case of receiving a setting packet from the outside-site M-plane 800 via the WAN IF 604, transfers the setting packet to the user management unit 602.

FIG. 12 illustrates an example of a configuration of the carrier path table 701. For convenience, a VLAN (an example of a communication path) in the carrier site 250 may be referred to as a "carrier VLAN," and a VLAN in a user site (1) may be referred to below as a "user VLAN." In addition, it may be that a table with the same configuration as the carrier path table 701 in FIG. 12 (for convenience, referred to below as a "maintenance carrier path table") is included in the management information 295 in the maintenance system 260, and setting of the carrier path table 701 is performed based on this table.

The carrier path table 701 has a record for each carrier VLAN connected to the carrier termination apparatus 350. Each record has information such as a U-ID 1201, a carrier V-ID 1202, a user V-ID 1203, a T-ID 1204, and a QoS 1205. One carrier VLAN is taken as an example ("target carrier VLAN" in the description of FIG. 12).

The U-ID 1201 represents an ID of a user for a user site (1) which is a transmission destination and a transmission source for packets that go via the target carrier VLAN. Note that, from among the carrier path table 701 and the maintenance carrier path table, the carrier path table 701 does not need to have the U-ID 1201.

The carrier V-ID 1202 represents an ID for the target carrier VLAN. The user V-ID 1203 represents an ID of a user VLAN to which the target carrier VLAN is connected to via a tunnel. The T-ID 1204 represents an ID of the tunnel to which the target carrier VLAN is connected. The QoS 1205 represents a QoS as the priority of communication via the target carrier VLAN.

In accordance with the example illustrated in FIG. 12, the carrier VLAN with the carrier V-ID 1202 of "1" is connected to the VLAN with the user V-ID 1203 of "300" via the tunnel with the T-ID 1204 of "1."

The carrier packet processing unit 705 in the carrier termination apparatus 350 performs packet processing on the basis of a QoS represented in the carrier path table 701. For example, the following processing is performed.

The carrier packet processing unit 705, in a case of receiving a packet which has been received via the LAN IF 704, specifies the user V-ID 1203 and T-ID 1204 corresponding to the carrier V-ID 1201 of the carrier VLAN that the packet has gone via. The carrier packet processing unit 705 performs V-ID conversion processing (processing for converting the carrier V-ID of the packet to the specified user V-ID), encapsulates the packet (applies a tunnel header which includes the value of the specified T-ID 1204 to the packet), and outputs the encapsulated packet to the tunnel with this T-ID 1204 from the WAN IF 703.

The carrier packet processing unit 705, in a case of receiving a packet that has been received via the WAN IF 703, decapsulates the packet, and specifies the carrier V-ID 1202 corresponding to the T-ID 1204 of the tunnel that the packet has gone via and the user V-ID 1203 of the packet. The carrier packet processing unit 705 performs V-ID conversion processing (processing for converting the user V-ID of the packet to the specified carrier V-ID), and outputs the packet to the VLAN with the specified carrier V-ID 1202 from the LAN IF 704.

FIG. 13 illustrates an example of a configuration of a setting management table 1300.

The setting management table 1300 is a table included in the management information 295 in the maintenance system 260. The setting management table 1300 has a record for each user VLAN. Each record has information such as a U-ID 1301, a 5G flag 1302, a type 1303, a V-ID 1304, a T-ID 1305, an S-ID 1306, an E-ID 1307, an R-ID list 1308, and a QoS 1309. One user VLAN is taken as an example ("target user VLAN" in the description of FIG. 13).

The U-ID 1301 represents the ID of the user of the user site (1) which has the target user VLAN. The 5G flag 1302 is a flag that represents whether or not communication via the target user VLAN is communication that uses local 5G. The type 1303 represents the type (for example, U-VLAN, C-VLAN, or M-VLAN) of the target user VLAN.

The V-ID 1304 represents an ID for the target user VLAN. Note that a plurality of U-VLANs may be connected to a U-plane 221, and in this case a V-ID may be prepared for each U-VLAN.

The T-ID 1305 represents an ID of a tunnel to which the target user VLAN is connected. Note that in a case where C-plane tunnels 272 are distinguished between tunnels for C-planes and tunnels for M-planes, different T-IDs may be respectively associated with the types "C-VLAN" and "M-VLAN." In other words, a T-ID of a tunnel for a C-plane connected to a C-VLAN is associated with the C-VLAN, and a T-ID for a tunnel for an M-plane connected to an M-VLAN is associated with the M-VLAN.

The S-ID 1306 represents an ID of a line terminal apparatus at the start point (one end) of the tunnel. The E-ID 1307 represents an ID of a line terminal apparatus at the end point (the other end) of the tunnel. The R-ID list 1308 represents a list of IDs (R-IDs) of transport apparatuses that are nodes of the tunnel.

The QoS 1309 represents a QoS as the priority of communication via the target user VLAN. In the present embodiment, the QoS of a C-VLAN is higher than the QoS of a U-VLAN. For example, the QoS of a C-VLAN is set to the highest QoS. As a result, a packet (signal) transmitted from the C-plane 280 is processed (transferred) with the highest priority. Accordingly, for example, the possibility of a signal from the C-plane 280 being dropped and communication between a user terminal 3 and a server 31 being disconnected is reduced.

According to the example illustrated by FIG. 13, a C-VLAN with the user V-ID 1304 of "300" is connected to a tunnel with the T-ID 1305 of "30," and this tunnel goes via transport apparatuses with R-IDs of "4," "5," and "6," which connect a line terminal apparatus with the S-ID 1306 of "3" and a line terminal apparatus with the E-ID 1307 of "10."

Note that, in FIG. 13, a record 1351 is an example of a record that corresponds to a carrier_U-VLAN in the description of a second embodiment. A record 1352 is an example of a record that corresponds to a sensor_VLAN in the description of a third embodiment. Note that, in the third embodiment, the sensor_VLAN may be connected to a C-plane tunnel, but a tunnel dedicated to the sensor_VLAN may be set by the inter-site setting unit 291 between a user site (1) and a carrier site.

FIG. 14 illustrates an example of a configuration of an uplink processing table 401U. In addition, it may be that a table with the same configuration as the uplink processing table 401U in FIG. 14 (for convenience, referred to below as a "maintenance uplink processing table") is included in the management information 295 in the maintenance system 260, and setting of the uplink processing table 401U is performed based on this table. Note that, for example, in a case where the carrier terminal described in the second embodiment is not present, the local breakout (LB) column does not need to be present.

The uplink processing table 401U is one processing table 401 in a U-plane 221, and is a table for processing uplink communication. The uplink processing table 401U has a record for each mobile terminal in the user site (1) in which the U-plane 221 is set. Each record has information such as a U-ID 1401, a SIM-ID 1402, an M-ID 1403, an LB 1404, an APN 1405, a V-ID 1406, a QCI 1407, and a QoS 1408. One mobile terminal is taken as an example ("target mobile terminal" in the description of FIG. 14). Note that a "mobile terminal" is a user terminal in the present embodiment, but, in the second embodiment, in addition to user terminals, a carrier terminal is present as a mobile terminal.

The U-ID 1401 represents the ID of the user of the user site (1) in which the target mobile terminal is used. Note that, from among the uplink processing table 401U and the maintenance uplink processing table, the uplink processing table 401U does not need to have the U-ID 1401.

The SIM-ID 1402 represents an ID of a SIM card of the target mobile terminal. The M-ID 1403 represents an ID of the target mobile terminal (for example, an IP address or an ID for uniquely identifying a device in a system). Note that, from among the uplink processing table 401U and the maintenance uplink processing table, the maintenance uplink processing table does not need to have the M-ID 1403. This is because the M-ID is information temporarily set by the U-plane packet processing unit 405, which transfers packets transmitted or received by the target mobile terminal.

The LB 1404 represents whether or not local breakout is permitted in relation to communication by the target mobile terminal. The LB 1404 being "1" means that local breakout is permitted. The LB 1404 being "0" is associated with a carrier terminal which is described in the second embodiment.

The APN 1405 represents an access point name (APN) which is designated in communication by the target mobile terminal. Note that an APN may be a management ID which is associated with each virtual core provided in a U-plane 221. For example, a table for correspondence between IP addresses and APNs or a table for correspondence between an ID that specifies a SIM and an APN may be set in the U-plane 221.

The V-ID 1406 represents an ID of a U-VLAN through which packets transmitted and received by the target mobile terminal go via. Note that a plurality of U-VLANs may be connected to a U-plane 221, and in this case a V-ID may be prepared for each U-VLAN. As a result, for example, using a plurality of U-VLANs can be expected for usage such as connecting to a plurality of sites (for example, a plurality of user sites (2)), or transferring data to individual applications.

The QCI 1407 represents a QoS class identifier (QCI) for the QoS which is assigned to the corresponding U-VLAN. The QoS 1408 represents the QoS which is assigned to the corresponding U-VLAN.

The U-plane packet processing unit 405 of a U-plane 221 performs, on the basis of the QoS represented by the uplink processing table 401U, packet processing in uplink communication. For example, the following processing is performed.

The U-plane packet processing unit 405, in a case of receiving a packet via the mobile IF 403, determines whether or not the LB 1404 is "1" for the M-ID of the transmission source mobile terminal for the packet (the M-ID being an ID generated at a time of a connection with the mobile terminal).

In a case where the LB 1404 is "1," the U-plane packet processing unit 405 encapsulates the packet with a mobile communication header, and specifies the V-ID 1406 and the QoS 1408 corresponding to the designated APN. The U-plane packet processing unit 405 includes the value of the specified QoS 1408 in the packet as a class of service (CoS) value, and transmits the packet from the LAN IF 404 via the U-VLAN with the specified V-ID 1406.

In the case where the LB 1404 is "0," the U-plane packet processing unit 405 includes the value of the QoS 1408, corresponding to the designated APN, in the packet as a class of service (CoS) value, and transmits the packet from the LAN IF 404 via the U-VLAN with the V-ID 1406 corresponding to the designated APN.

Note that, in FIG. 14, the second record from the bottom is an example of a record that corresponds to a carrier terminal in the second embodiment.

FIG. 15 illustrates an example of a configuration of a downlink processing table 401D. In addition, it may be that a table with the same configuration as the downlink processing table 401D in FIG. 14 (for convenience, referred to below as a "maintenance downlink processing table") is included in the management information 295 in the maintenance system 260, and setting of the downlink processing table 401D is performed based on this table.

The downlink processing table 401D is one processing table 401 in a U-plane 221, and is a table for processing downlink communication. The downlink processing table 401D has a record for each mobile terminal in the user site (1) in which the U-plane 221 is set. Each record has information such as a U-ID 1501, an R_V-ID 1502, a SIM-ID 1503, an M-ID 1504, an LB 1505, an APN 1506, a T-ID 1507, a QCI 1508, an S_V-ID 1509, and a QoS 1510. One mobile terminal is taken as an example ("target mobile terminal" in the description of FIG. 15).

The information 1501, 1503 to 1506, 1508, and 1510 is similar to the information 1401 to 1405, 1407, and 1408 described with reference to FIG. 14. The R_V-ID 1502 is a reception V-ID, and specifically represents the V-ID of a received packet. The S_V-ID 1509 is a transmission V-ID, and specifically represents the V-ID (specifically the ID of an MBH_U-VLAN) of packet which is to be transmitted. The T-ID 1507 is an ID for a mobile tunnel, and is determined according to processing of a control signal between a U-plane 221 and the target mobile terminal when connecting to the target mobile terminal. Note that, from among the downlink processing table 401D and the maintenance downlink processing table, the maintenance downlink processing table does not have the T-ID (ID for a mobile tunnel) 1507.

The U-plane packet processing unit 405 of a U-plane 221 performs, on the basis of the QoS represented by the downlink processing table 401D, packet processing in downlink communication. For example, the following processing is performed.

The U-plane packet processing unit 405, in a case of receiving a packet via the LAN IF 404, searches the downlink processing table 401D for an M-ID 1504 conforming to the IP header of the packet. The U-plane packet processing unit 405 obtains the T-ID 1507 corresponding to a found M-ID 1504, encapsulates the received packet with a mobile communication header that includes the T-ID 1507, and transfers this packet to the mobile IF 403.

In the case where the target mobile terminal is a carrier terminal, because the received packet is already encapsulated, the U-plane packet processing unit 405 performs V-ID conversion processing (processing for converting between a reception V-ID and a transmission V-ID), and then transfers the packet from the mobile IF 403. Specifically, for example, the U-plane packet processing unit 405, with the reception V-ID (V-ID of a received packet) as a key, confirms whether the LB 1505 is "1" or "0," transmits the packet after adding a header in the case where the LB is "1," and performs V-ID conversion processing in the case where the LB is "0."

Figure 16:
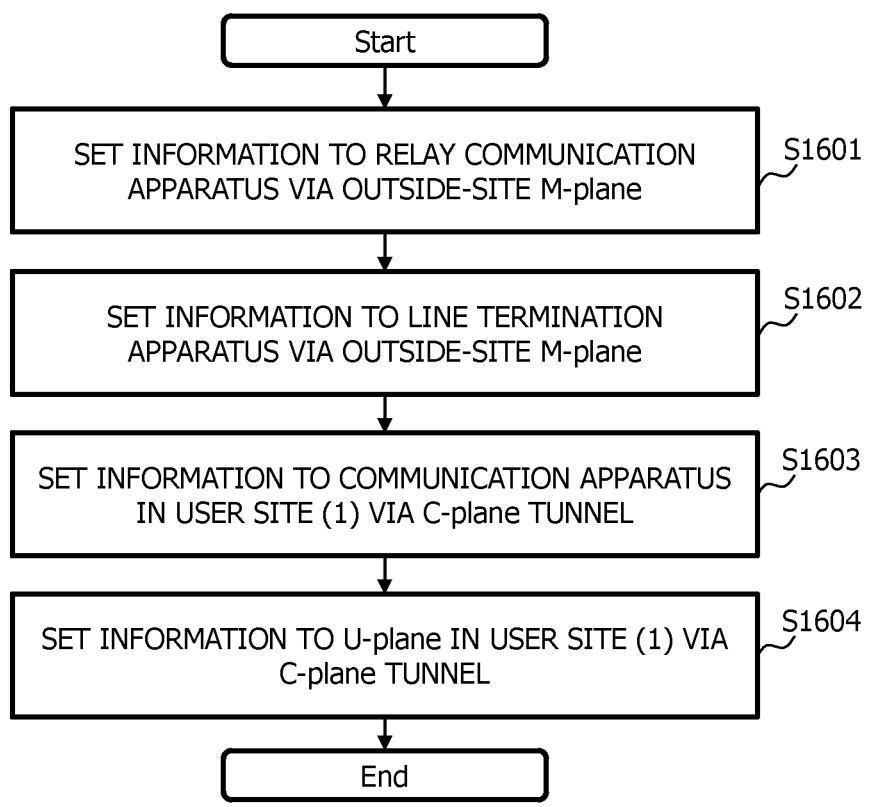
FIG. 16 illustrates an example of a flow of path setting processing.

FIG. 16 illustrates an example of a flow of path setting processing.

The inter-site setting unit 291 sets information to a transport apparatus in the WAN 205 via the outside-site M-plane 800 (S1601), and sets information to the line terminal apparatuses 220 and 350 via the outside-site M-plane 800 (S1602). As a result, a U-plane tunnel 271 and a C-plane tunnel 272 are opened.

Next, the in-site setting unit 292 sets information to a communication apparatus 222 in a user site (1) via the C-plane tunnel 272 (S1603), and sets information to a U-plane 221 in the user site (1) via the C-plane tunnel 272 (S1604). As a result, various VLANs are opened.

Subsequently, it becomes possible to use a user terminal that includes a SIM card to communicate with a local 5G user site.

A setting change of the communication apparatus 222, the user termination apparatus 220, or the U-plane 221 in the user site (1) is possible by rewriting a table via the C-plane tunnel 272 and a M-VLAN.

Second Embodiment

A second embodiment is described. In this case, points differing from the first embodiment are mainly described, and description of points in common with the first embodiment is omitted or simplified.

Figure 17:
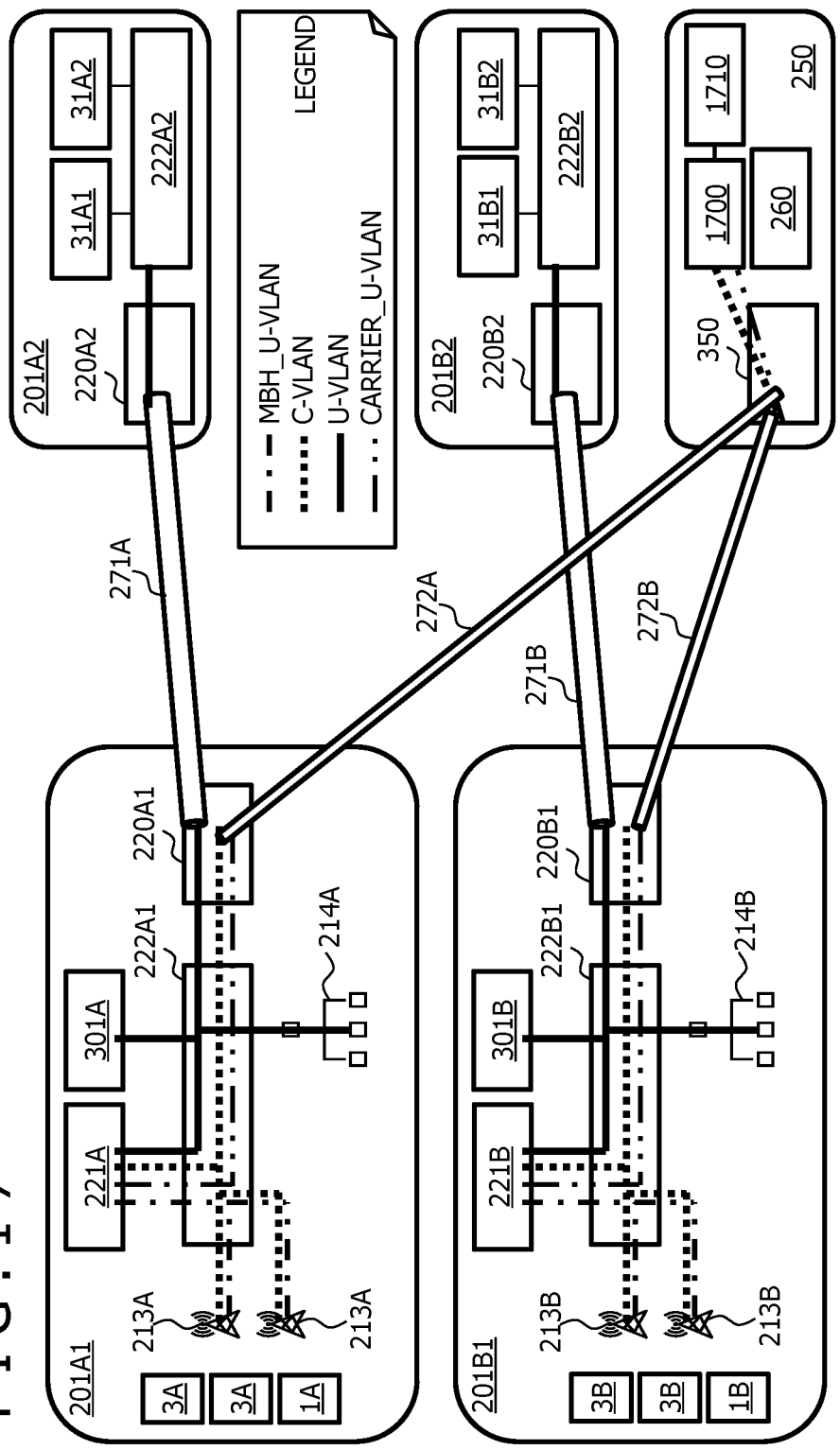
FIG. 17 illustrates an example of an overall configuration of a system according to a second embodiment.

FIG. 17 illustrates an example of an overall configuration of a system according to the second embodiment.

The user A is taken as an example. There is a carrier terminal 1A as an example of a mobile terminal. The carrier terminal 1A may be a mobile terminal provided from a communication carrier, and may be used by the user A or maintenance staff. The carrier terminal 1A may be an Internet of things (IoT) device.

In place of the C-plane 280, the carrier site 250 has a C/U-plane 1700 (in other words, in addition to the C-plane 280, has a carrier terminal U-plane that transfers packets transmitted or received by the carrier terminal 1A). In addition, the carrier site 250 has a carrier terminal server 1710 which is connected to the C/U-plane 1700. Communication is performed between the carrier terminal server 1710 and the carrier terminal 1A.

As a VLAN, a carrier_U-VLAN is set by the in-site setting unit 292 in the user site (A1) 201A1 via the C-plane tunnel 272A. Packets transmitted and received between the carrier terminal 1A and the carrier terminal server 1710 go via the carrier_U-VLAN. The carrier_U-VLAN is connected to the U-plane 221A and the user termination apparatus 220A1. In addition, in the carrier site 250, the carrier_U-VLAN is connected to the line terminal apparatus 350 and the C/U-plane 1700. The carrier_U-VLAN in the user site (A1) 201A1 and the carrier_U-VLAN in the carrier site 250 are connected to each other via the C-plane tunnel 272A. Note that FIG. 17 omits illustration of a M-VLAN in order to improve visual recognition, but an M-VLAN is also set in the second embodiment. In addition, a tunnel for the carrier_U-VLAN may be established between a user site (A1) and the carrier site 250.

Data transmitted from the carrier terminal 1A reaches the C/U-plane 1700 through a base station 213A, the MBH_U-VLAN, the U-plane 221A, the carrier_U-VLAN, the C-plane tunnel 272A, and the carrier_U-VLAN, and is transferred from the C/U-plane 1700 to the carrier terminal server 1710. In the case where the carrier terminal 1A is an IoT device, it is possible for the carrier terminal server 1710 to monitor the user site (A1) via the carrier terminal 1A, or for the carrier terminal 1A to monitor its own state.

By virtue of the second embodiment, a U-plane for a carrier terminal 1 is disposed in the carrier site. Accordingly, it is possible to conceal data transmitted or received by the carrier terminal 1 from the user. In addition, the carrier_U-VLAN is prepared as an example of a dedicated in-site communication path through which data transmitted or received by the carrier terminal 1 goes via. Accordingly, communication suitable for the QoS of the C-VLAN, U-VLAN, and carrier_U-VLAN is possible.

Third Embodiment

Figure 18:
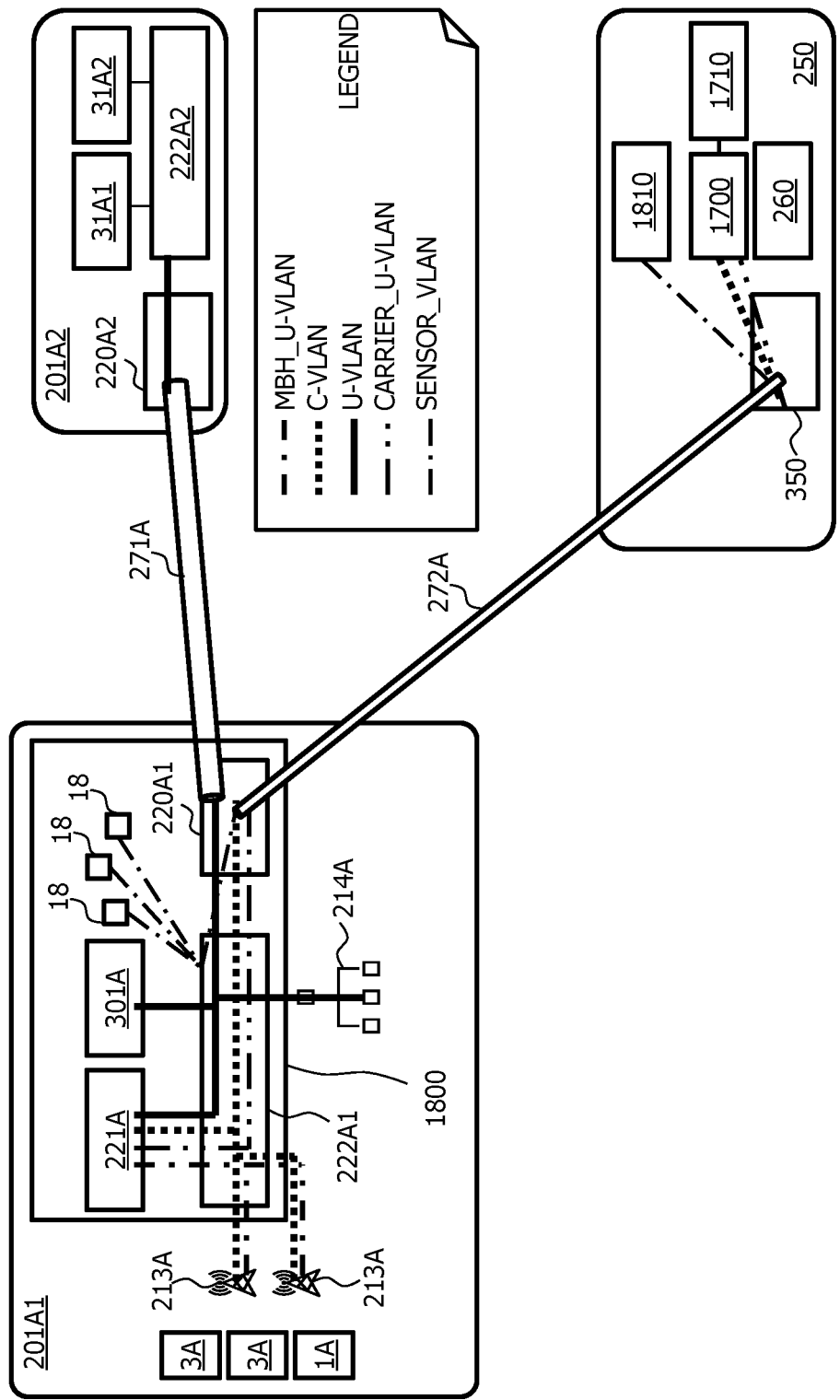
FIG. 18 illustrates an example of an overall configuration of a system according to a third embodiment.

FIG. 18 illustrates an example of an overall configuration of a system according to the third embodiment.

The third embodiment is described. In this case, points differing from the first and second embodiments are mainly described, and description of points in common with the first and second embodiments is omitted or simplified.

The user A is taken as an example. The user site (A1) has a communication package 1800 (may be referred to as a 5G box). The communication package 1800 includes the U-plane 221A, the communication apparatus 222A1, the user termination apparatus 220A1, and the edge server 301A. In addition, the communication package 1800 has one or more sensors 18 which are respectively connected to the communication apparatus 222A1 by wire (or wirelessly (for example, by infrared communication or short-range wireless communication)). The one or more sensors 18 measure a state of an apparatus in the communication package 1800, and transmit data (for example, a metric value such as temperature or humidity) representing the measured state.

The carrier site 250 has an apparatus-monitoring server 1810. The apparatus-monitoring server 1810 is an example of a server that receives data from the one or more sensors 18.

As a VLAN, a sensor_VLAN is set by the in-site setting unit 292 to the user site (A1) 201A1 via the C-plane tunnel 272A. Data transmitted from the one or more sensors 18 goes via the sensor_VLAN. The sensor_VLAN is connected to the one or more sensors 18 and the user termination apparatus 220A1. In addition, in the carrier site 250, the sensor_VLAN is connected to the line terminal apparatus 350 and the apparatus-monitoring server 1810. The sensor_VLAN in the user site (A1) 201A1 and the sensor_VLAN in the carrier site 250 are connected to each other via the C-plane tunnel 272A. Note that FIG. 18 omits illustration of a M-VLAN in order to improve visual recognition, but an M-VLAN is also set in the third embodiment. In addition, a tunnel for the sensor_VLAN may be established between a user site (A1) and the carrier site 250.

By virtue of the third embodiment, the sensor_VLAN is prepared as an example of a dedicated in-site communication path via which data is transmitted or received by the one or more sensors 18. Accordingly, communication suitable for the QoS of the C-VLAN, U-VLAN, and sensor_VLAN is possible.

Although the present disclosure has been described with reference to example embodiments, those skilled in the art will recognize that various changes and modifications may be made in form and detail without departing from the spirit and scope of the claimed subject matter.

What is claimed is:

1. A communication support system, comprising:
   an inter-site setting unit configured to set a U-plane inter-site path which is an inter-site communication path that connects a first user site with a second user site via a wide area network, and a C-plane inter-site path which is an inter-site communication path that connects a C-plane site with the first user site via the wide area network; and
   an in-site setting unit configured to set an in-site communication path which is a communication path within the first user site and which connects to an inter-site communication path, wherein
   the first user site is a site that has a base station and a user plane (U-plane) that processes user data,
   the second user site is a site that has a server,
   the user data is data which is transmitted and received between a user terminal and the server, through the base station,
   the C-plane site is any site that is not a user site, and has a control plane (C-plane) that performs at least one of authentication of user terminals and session management control,
   the U-plane inter-site path is an inter-site communication path via which data is transmitted or received by the U-plane, and
   the C-plane inter-site path is an inter-site communication path via which the C-plane transmits or receives a signal.

2. The communication support system according to claim 1, wherein,
   in the first user site, an in-site communication path which connects to the U-plane inter-site path and through which data transmitted or received by the U-plane goes via is distinguished from an in-site communication path which connects to the C-plane inter-site path and through which a signal transmitted or received by the C-plane goes via.

3. The communication support system according to claim 2, wherein
the first user site has a first user termination apparatus which is a line terminal apparatus,
the second user site has a second user termination apparatus which is a line terminal apparatus,
the C-plane site has a control termination apparatus which is a line terminal apparatus,
the U-plane inter-site path is an inter-site communication path which connects the first user termination apparatus and the second user termination apparatus,
the C-plane inter-site path is an inter-site communication path which connects the first user termination apparatus and the control termination apparatus,
the in-site setting unit, via the C-plane inter-site path, sets the following in-site communication paths which are connected to the first user termination apparatus,
a mobile backhaul (MBH) side U-plane in-site path which is an in-site communication path through which user data transmitted and received between the base station and the U-plane goes via,
a U-plane in-site path which connects to the U-plane inter-site path and through which user data transmitted and received between the U-plane and the server goes via, and
a C-plane in-site path which is connected to the C-plane inter-site path and through which signals transmitted or received by the C-plane go via.

4. The communication support system according to claim 2, wherein
the distinguishing of the in-site communication path is distinguishing a virtual LAN (VLAN) or distinguishing a network address.

5. The communication support system according to claim 3, wherein
the first user site has an in-site management plane (M-plane) which is an M-plane for inside the first user site,
the inter-site setting unit sets the U-plane inter-site path and the C-plane inter-site path through an inter-site management plane (M-plane) which is an M-plane for between sites, and
the in-site setting unit sets, via the C-plane inter-site path and through the first user termination apparatus and the in-site M-plane, an M-plane in-site path which is connected to the C-plane inter-site path and through which signals transmitted or received by the in-site M-plane go via as the in-site communication path which is connected to the first user termination apparatus.

6. The communication support system according to claim 1, wherein
for each of a plurality of inter-site paths, a frequency at which the inter-site path is used is higher the higher a priority set for the inter-site path, and
the inter-site setting unit sets a priority higher than a priority for the U-plane inter-site path as a priority for the C-plane inter-site path.

7. The communication support system according to claim 2, wherein
in the first user site, a carrier terminal that is an information processing terminal provided from a communication carrier transmits and receives data through the base station,
the C-plane site, which is any site that is not a user site, or another site has a carrier U-plane that is a U-plane for transferring data transmitted or received by the carrier terminal,
the in-site setting unit sets, as the in-site communication path connected to the first user termination apparatus, a carrier U-plane in-site path through which data transmitted or received by the carrier U-plane goes via and which is connected to the C-plane inter-site path, and
data respectively transmitted or received by the carrier terminal and the carrier U-plane goes via the MBH side U-plane in-site path, the carrier U-plane in-site path, and the C-plane inter-site path.

8. The communication support system according to claim 1, wherein
the first user site has a communication package that includes the U-plane and the first user termination apparatus,
the communication package has one or more sensors each connected by wire, and
the in-site setting unit sets, as the in-site communication path connected to the first user termination apparatus, a sensor in-site path through which data respectively transmitted from the one or more sensors goes via and which is connected to the C-plane inter-site path.

9. A communication support method for a computer, comprising:
setting a U-plane inter-site path which is an inter-site communication path that connects a first user site with a second user site via a wide area network, and a C-plane inter-site path which is an inter-site communication path that connects a C-plane site with the first user site via the wide area network; and
setting an in-site communication path which is a communication path within the first user site and which connects to an inter-site communication path, wherein
the first user site is a site that has a base station and a user plane (U-plane) that processes user data,
the second user site is a site that has a server,
the user data is data which is transmitted and received between a user terminal and the server, through the base station,
the C-plane site is any site that is not a user site, and has a control plane (C-plane) that performs at least one of authentication of user terminals and session management control,
the U-plane inter-site path is an inter-site communication path via which data is transmitted or received by the U-plane, and
the C-plane inter-site path is an inter-site communication path via which the C-plane transmits or receives a signal.

* * * * *